(12) United States Patent
Rajakarunanayake et al.

(10) Patent No.: US 9,065,869 B2
(45) Date of Patent: *Jun. 23, 2015

(54) SOCIAL NETWORK DEVICE MEMBERSHIPS AND APPLICATIONS

(75) Inventors: Yasantha N. Rajakarunanayake, San Ramon, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 13/342,301

(22) Filed: Jan. 3, 2012

(65) Prior Publication Data

US 2013/0091208 A1 Apr. 11, 2013

Related U.S. Application Data

(60) Provisional application No. 61/545,147, filed on Oct. 8, 2011.

(51) Int. Cl.
*G06F 15/16* (2006.01)
*H04L 29/08* (2006.01)
(Continued)

(52) U.S. Cl.
CPC .............. *H04L 67/306* (2013.01); *H04L 51/32* (2013.01); *H04W 4/206* (2013.01); *H04L 67/303* (2013.01)

(58) Field of Classification Search
CPC ............ H04L 12/1822; H04L 12/1827; H04L 12/5895; H04L 51/38; H04L 63/0407; H04L 67/22; H04L 67/32; H04L 67/104; H04L 67/1063; H04L 65/1083
USPC .......................... 709/203, 204, 205, 206, 223
See application file for complete search history.

(56) References Cited

U.S. PATENT DOCUMENTS 7,698,380 B1 4/2010 Amidon et al.
7,904,511 B2 * 3/2011 Ryan et al. .................... 709/204
(Continued)

FOREIGN PATENT DOCUMENTS

CN 101645933 A 2/2010
CN 102196014 A 9/2011
(Continued)

OTHER PUBLICATIONS

European Patent Office; European Search Report; EP Application No. 12006973.7; May 10, 2013; 3 pgs.
(Continued)

*Primary Examiner* — Thu Ha Nguyen
(74) *Attorney, Agent, or Firm* — Garlick & Markison; Bruce E. Garlick

(57) ABSTRACT

A social device including capabilities for participating in a social network group via a social infrastructure. Various functions and resources of the social device are accessible by members of the social network group. Likewise, the social device may be configured to access services and other resources of the social network group. The social device may participate in the social network group through an autonomous, automated or member-triggered process. In one embodiment, the social device functions as a social gateway to communicatively couple a child node and a social network group. The social gateway may comprise a set top box or mobile communication device, and the child node may be a human user that interacts with the social gateway through a user interface. In a further embodiment, the social gateway may concurrently operate as a child device that communicates with a social network group through another social device.

20 Claims, 16 Drawing Sheets

(51) Int. Cl.
*H04W 4/20* (2009.01)
*H04L 12/58* (2006.01)

(56) References Cited

U.S. PATENT DOCUMENTS

| | | | |
|---|---|---|---|
| 7,970,883 B2* | 6/2011 | Yoshikai et al. | 709/223 |
| 8,478,735 B1* | 7/2013 | Archambault et al. | 707/711 |
| 8,572,169 B2* | 10/2013 | Partovi et al. | 709/204 |
| 8,676,908 B2* | 3/2014 | Paul et al. | 709/206 |
| 2004/0029553 A1* | 2/2004 | Cain | 455/403 |
| 2004/0258064 A1* | 12/2004 | Nakamura et al. | 370/389 |
| 2007/0147255 A1 | 6/2007 | Oyman | |
| 2008/0222308 A1 | 9/2008 | Abhyanker | |
| 2009/0019061 A1* | 1/2009 | Scannell, Jr. | 707/10 |
| 2009/0307345 A1 | 12/2009 | Carter et al. | |
| 2010/0015991 A1* | 1/2010 | Evans et al. | 455/456.1 |
| 2010/0169789 A1 | 7/2010 | Cheng et al. | |
| 2010/0226284 A1 | 9/2010 | Bill | |
| 2010/0244074 A1* | 9/2010 | Rouse et al. | 725/100 |
| 2010/0257239 A1* | 10/2010 | Roberts | 709/204 |
| 2011/0053692 A1* | 3/2011 | Farr-Jones et al. | 463/40 |
| 2011/0113113 A1* | 5/2011 | Ryan et al. | 709/206 |
| 2011/0153740 A1 | 6/2011 | Smith | |
| 2011/0161987 A1* | 6/2011 | Huang et al. | 719/318 |
| 2012/0253489 A1* | 10/2012 | Dugan | 700/91 |
| 2012/0284333 A1* | 11/2012 | Neff | 709/204 |
| 2013/0036459 A1* | 2/2013 | Liberman et al. | 726/6 |
| 2013/0054695 A1* | 2/2013 | Holman et al. | 709/204 |
| 2013/0060869 A1* | 3/2013 | Davis et al. | 709/206 |
| 2013/0179429 A1* | 7/2013 | Archambault et al. | 707/711 |
| 2013/0268357 A1* | 10/2013 | Heath | 705/14.53 |
| 2014/0129942 A1* | 5/2014 | Rathod | 715/720 |
| 2014/0172975 A1* | 6/2014 | Smith | 709/204 |
| 2014/0317188 A1* | 10/2014 | Thorne-Yocam | 709/204 |
| 2014/0351351 A1* | 11/2014 | Yu et al. | 709/206 |

FOREIGN PATENT DOCUMENTS

| | | |
|---|---|---|
| EP | 1942614 A1 | 7/2008 |
| KR | 1020050042784 A | 5/2005 |
| KR | 1020090112742 A | 10/2009 |

OTHER PUBLICATIONS

European Patent Office; European Search Report; EP Application No. 12005729; Mar. 18, 2013; 6 pgs.

European Patent Office; European Search Report; EP Application No. 12005730.2; Mar. 18, 2013; 3 pgs.

European Patent Office; European Search Report; EP Application No. 12006969.5; Apr. 3, 2013; 3 pgs.

* cited by examiner

US 9,065,869 B2

SOCIAL NETWORK DEVICE MEMBERSHIPS AND APPLICATIONS

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Patent Application Ser. No. 61/545,147, entitled "Social Network Device Memberships and Resource Allocation", filed Oct. 8, 2011, which is hereby incorporated herein by reference in its entirety and made part of the present U.S. Utility Patent Application for all purposes.

BACKGROUND OF THE INVENTION

1. Technical Field of the Invention

The invention relates generally to social networking; and, more particularly, it relates to social network device memberships, resource allocation, and related services and communications.

2. Description of Related Art

The popularity and growth of social network sites and services has increased dramatically over the last few years. Present social network sites include Facebook®, Google+®, Twitter®, MySpace®, YouTube®, LinkedIn®, Flicker®, MYUBO™, Bebo® and the like. Such social networking (SNET) sites are typically web-based and organized around user profiles and/or collections of content accessible by members of the network. Membership in such social networks is comprised of individuals, or groupings of individuals, who are generally represented by profile pages and permitted to interact as determined by the social networking service.

In many popular social networks, especially profile-focused social networks, activity centers on web pages or social spaces that enable members to view profiles, communicate and share activities, interests, opinions, status updates, audio/video content, etc., across networks of contacts. Social networking services might also allow members to track certain activities of other members of the social network, collaborate, locate and connect with existing friends, former acquaintances and colleagues, and establish new connections with other members.

Individual members typically connect to social networking services through existing web-based platforms via a computing device, tablet or smartphone. Members often share a common bond, social status, or geographic or cultural connection with their respective contacts. Smartphone and games-based mobile social networking services are examples of rapidly developing areas.

In so-called "cloud" computing, computing tasks are performed on remote computers/servers which are typically accessed via Internet connections. One benefit of cloud computing is that may reduce the relative processing and storage capabilities required by user devices (e.g., a cloud computer may load a webpage accessed by a tablet device and communicate only required information back to the tablet). Accordingly, recent years have witnessed an ever-growing amount of content and application software being migrated from local or on-site storage to cloud-based data storage and management. Such software functionality/services and content are typically available on-demand via (virtualized) network infrastructures.

DETAILED DESCRIPTION OF THE INVENTION

As used herein, the terms "social network" and "SNET" comprise a grouping or social structure of devices and/or individuals, as well as connections, links and interdependencies between such devices and/or individuals. Members or actors (including devices) within or affiliated with a SNET may be referred to herein as "nodes", "social devices", "SNET members", "SNET devices", "user devices" and/or "modules". In addition, the terms "SNET circle", "SNET group" and "SNET sub-circle" generally denote a social network that comprises social devices and, as contextually appropriate, human SNET members and personal area networks ("PANs").

Figure 1:
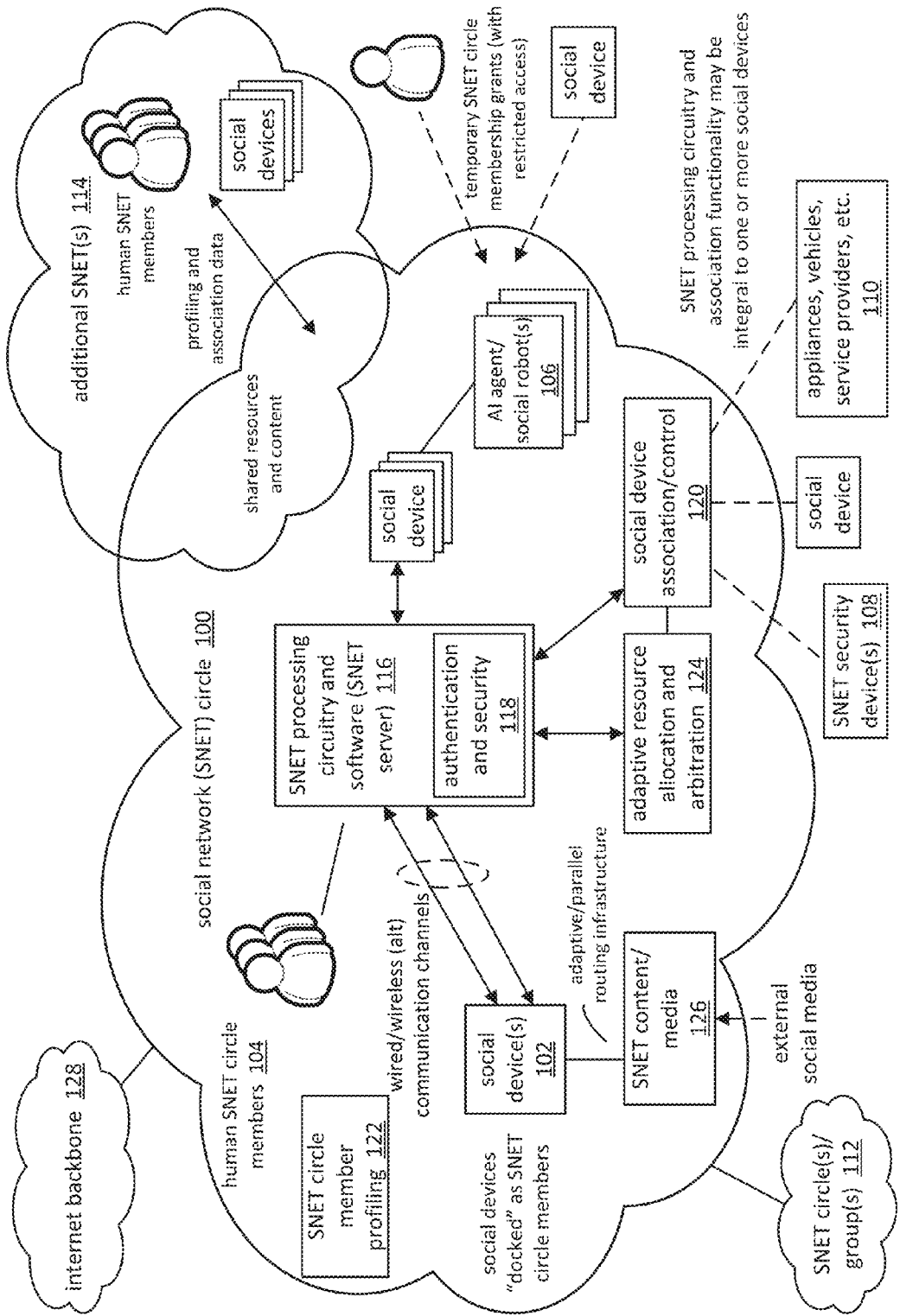
FIG. 1 illustrates an embodiment of a social network circle comprising social devices in accordance with the invention.

Referring now to FIG. 1, a social network circle/group 100 (hereinafter "SNET circle") comprising social devices 102 is shown. Beyond traditional social networking features and services, a SNET circle 100 and associated social devices 102 according to various embodiments of the invention include numerous novel features and attributes as described more fully below with general reference to the illustration.

Briefly, membership in the SNET circle 100 may comprise docked social devices 102 (an embodiment of which is described in conjunction with FIG. 7) and human SNET circle members 104, as well as proxies thereof. Further, SNET circle 100 nodes may include device services and software (e.g., applications) of various types participating as members. By way of example, SNET circle members might include artificial intelligence agents/social robots 106, SNET security device(s) 108, appliances, vehicles and service providers 110, common or authorized members/functionality of other SNET circles 112, etc. Further, access to specific content and resources of a SNET circle 100 may be shared with members of additional SNET(s) 114, including remote or web-based applications. Such access can be conditioned on acceptable profiling and association data. Similarly, social devices or individuals may be granted temporary or ad hoc memberships, with or without restricted access.

In the illustrated embodiment, formation, maintenance and operation of SNET group 100 is performed by standalone or distributed SNET processing circuitry and software 116. It is noted that the "SNET processing circuitry" may comprise hardware, hardware and software, software applications executed by SNET hardware, or various combinations thereof, and be configurable to support various functionalities disclosed herein. Further, the SNET processing circuitry 116 may be included in a standalone server, server farm, cloud-based resources, and/or the various types of devices described below, and incorporate authentication and security functionality 118. In addition, specialized middleware may also be utilized by SNETs according to the invention, including standardized middleware (or standardized communication protocols) with an associated certification process. Interactions and interdependencies within the SNET group 100 may involve one or more of an adaptive resource management, allocation and arbitration module 120, a social device association/control module 122, and a SNET group member profiling module 124 as described more fully below.

Distribution of internal and external SNET content/media 126 can be accomplished in a variety of ways in accordance with various embodiments of the invention. For example, media distribution may involve an adaptive or parallel network routing infrastructure involving a wide variety of communication protocols and wired and/or wireless communications channels. SNET content/media 126 may comprise, for example, various user-driven (advertising) channels, pictures, videos, links, online text, etc. Access to such content, as well as communications with and remote access to social devices 102 of the SNET circle 100, may occur over an Internet backbone 128, cellular communication system, WAN, LAN, etc.

Figure 2:
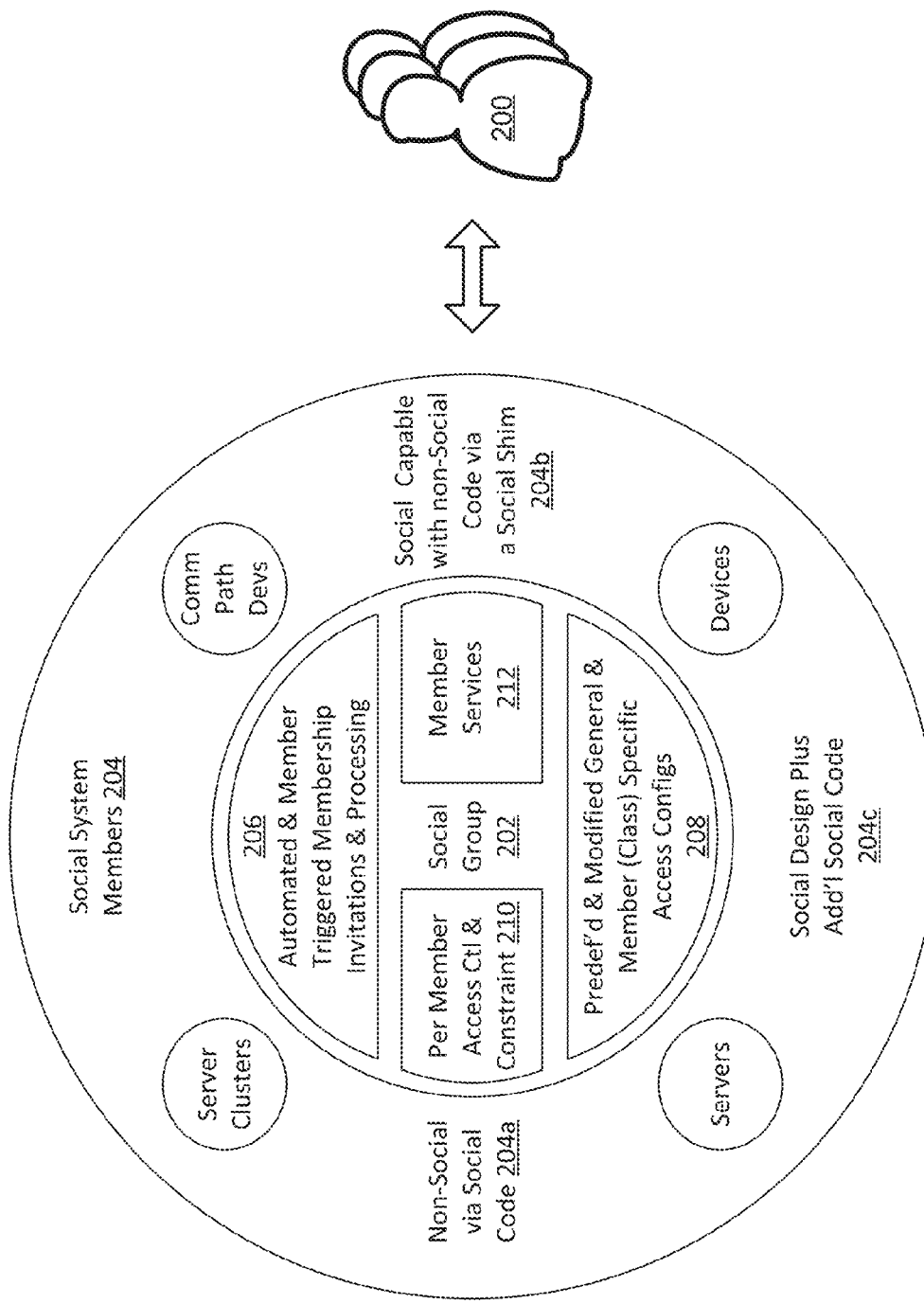
FIG. 2 illustrates an embodiment of a social group comprising a variety of members in accordance with the present invention.

FIG. 2 illustrates an embodiment of a social group 202 comprising a variety of members in accordance with the present invention. In this embodiment, membership in the social group 202 may include a variety of novel social system members 204 functioning in various capacities within the social group 202. As will be understood, certain of the social system members 204 may support direct or indirect associations between the social group 202 and human members/non-members and users 200.

In the illustrated embodiment, social system members (or nodes) 204 include one or more local or remote servers and server clusters that provide a support infrastructure for social group functionality and member operations (routing, data storage, services, etc.). Communications within the social group and with non-members may occur via dedicated or multi-function communication path devices.

Social system members 204 further include devices configured to operate as nodes within the social group 202. Social functionality in such devices and other social system members 204 can be implemented through various means. For example, a device may have integral hardware/firmware/software to support social group access and member operations. Alternatively, a general purpose device 204a may include social code that enables participation in the social group 202. In a further embodiment, a device 204b designed to include social functionality may participate in the social group 202 through a combination of non-social code and a social shim layer or driver wrapper. In yet another embodiment, a member device 204c having a social design may utilize additional social code, including code specific to a social group 202.

Participation in the social group 202 is supported through functionality that includes automated and member-triggered membership invitations and processing (membership management) 206. More particularly, membership management 206 may function to invite prospective members to participate in the social group 202 through automatic, automated and member-triggered processes. For example, membership management 206 might be configured by a human user 200 to establish a social group 202 by automatically inviting/accepting social system members having certain characteristics (such as devices owned or controlled by the user or acquaintances of the user).

Processing of accepted invitations and unsolicited requests to join the social group 202 may be conditioned upon input or authorization from an existing social system member(s) 204 or human user(s) 200 (e.g., through a user interface). Similarly, membership management 206 may be configured to generate automated suggestions regarding which prospective members receive an invitation. Various other approaches, such as those described herein, can be used to establish membership in accordance with the invention.

Access to and visibility of resources of a social group 202, including services and data, may be managed through general and member class-specific access configurations 208. For example, if membership in the social group 202 includes family members and associated devices, a uniform access configuration (or separate device and human configurations) could be applied across the class in an automatic or automated manner. In other embodiments, access control and constraints 210 are imposed on a per-member basis.

The social group 202 may offer a wide variety of member services 212, including both internal and external services accessible by social system members 204. By way of example, the social group 202 may offer email or other communication services between full members and/or authorized guest members and visitors. As with other resources of the social group 202, access control and constraints on member services 212 may be applied to individual members or classes of members.

Figure 3:
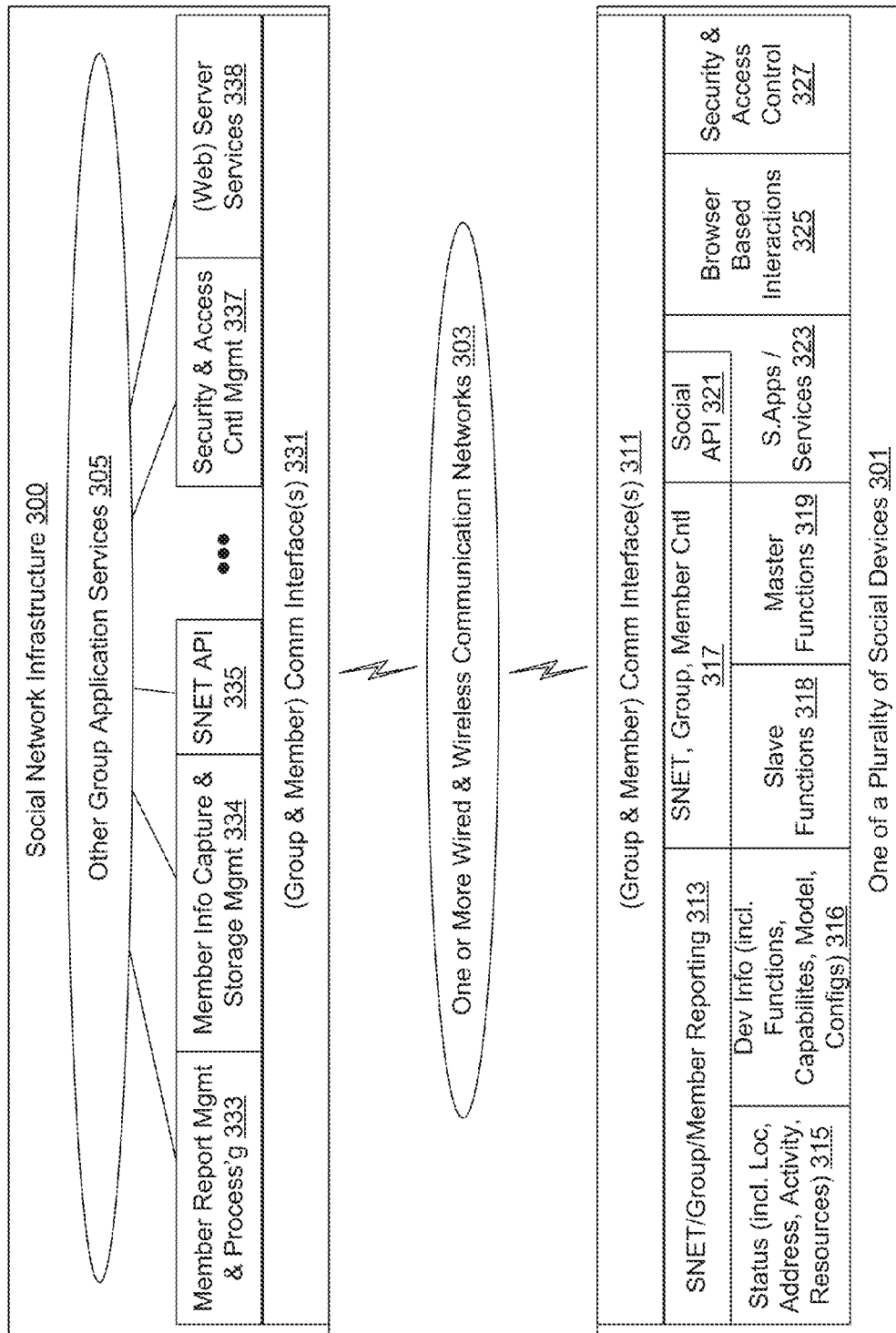
FIG. 3 is a functional block diagram illustrating a social network infrastructure and social devices in accordance with an embodiment of the invention.

FIG. 3 is a functional block diagram illustrating a social network (SNET) infrastructure 300 and (member) social device(s) 301 in accordance with an embodiment of the invention. Communications between the social network infrastructure 300 social device(s) 301 and other SNET members may occur over one or more wired and wireless communication networks 303. The SNET infrastructure 300 and social device(s) 300 are coupled to the communication networks 303 by communication interface(s) 331 and 311, respectively, either of which may support communications with individual SNET members or groups/classes of SNET members.

The SNET infrastructure 301 of the illustrated embodiment includes a number of functions and resources to support formation and maintenance of a SNET having social device members. In particular, member report management and processing 333 receives information from SNET/group/member reporting functions 313 in associated social devices 300. Such information may include, for example, status data 315 regarding the location, address and activities of a social device 300 and/or device user.

In addition, the social device 300 may provide device information 316 indicating, for example, device functions and social capabilities, device model number(s), device configurations, software versions, attached peripherals and downstream (social) devices, device resources and usage, etc. Device information 316 relating to available resources and current resource usage may be utilized by the SNET infrastructure 301 for purposes of SNET resource management, including dynamic resource allocation and arbitration.

In various embodiments, the social device 300 may have an obligation to gather, store and/or report device status/information 315/316 at different times. For example, reporting may be required upon affiliation or docking with a SNET, on a periodic basis, and/or during operational engagements with other intra- and inter-SNET resources and devices (including upstream and downstream devices).

Referring again to the SNET infrastructure 301, additional functionality and resources include, without limitation: SNET member information capture and storage management 334; a SNET application programming interface (API) 335 that allows SNET associated software components to communicate with each other; security and access control management 337 for maintaining the integrity of the SNET and affiliated data/resources; and (Web) server services 338. The social network infrastructure 301 further comprises other group application services 305 corresponding to the foregoing, as well as additional services such as those described herein. In one exemplary embodiment, the SNET infrastructure 301 might determine (e.g., by means of device information 316) the category and nature of a social device 300 wishing to participate in a SNET. As necessary, functionality in the SNET infrastructure 301 could then direct or trigger installation of appropriate application software and underlying drivers in the social device 300. Such operations might be performed with minimal involvement from inherent functions of the social device 300.

In the illustrated embodiment, the social device 300 comprises a number of additional functions and resources to support participation in a social network. More particularly, SNET, SNET and/or member control functions 317 may include slave functions 318, master functions 319, and various combinations thereof. Slave functions 318 include, for example, device (re-)configuration, directed resource allocation, managed resource arbitration, bridging operations, etc. Master functions 319 enable the social device 300 to establish, manage, and terminate various interactions between nodes or groups of nodes in a social network, including interactions involving the social device 300 itself.

The social device 300 further includes a social API 321 and browser-based interaction capabilities 327 to support, for example, relevant social applications and services 323 (which might comprise slave and master functions 318 and 319). Security and access control 325 layers permit the social device 300 to interface with or establish secure SNET groups/circles and control access to internal and external SNET resources.

It is noted that numerous of the functional building blocks of the embodiment of the invention illustrated by FIG. 3 may be incorporated, in whole or part, in one or more (application specific) integrated circuit devices. For example, an integrated circuit device may include a member reporting module to provide member reporting functionality (including communication of device status and device characteristics), device control capabilities, master/slave functions, security and access control modules, etc. Such an integrated circuit device may also include onboard processing capabilities and/or interface with a processor device. Alternatively, several of the functions described above may be incorporated, in whole or part, into an operating system and/or software loaded above an operating system kernel.

Figure 4:
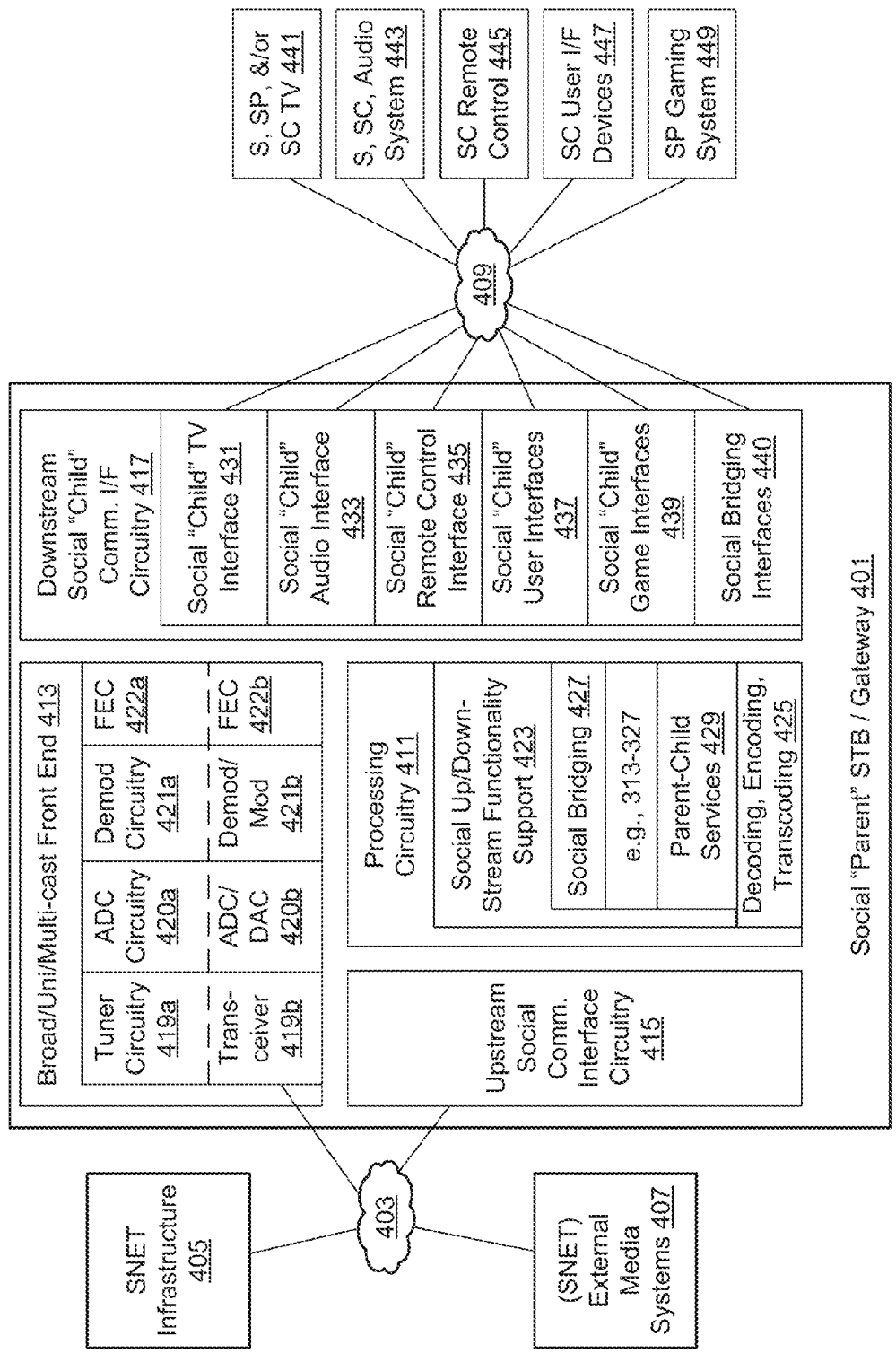
FIG. 4 is a schematic block diagram of an embodiment of a social set-top box (STB)/gateway in accordance with the invention.

FIG. 4 is a schematic block diagram of an embodiment of a social set-top box (STB)/gateway 401 in accordance with the invention. The STB/gateway 401 provides a number of functions, including conversion of signals from upstream sources into content that can be consumed by downstream social devices. The STB/gateway 401 may further operate as a gateway that supports unidirectional or bidirectional communications and bridging between upstream and downstream devices.

Figure 5:
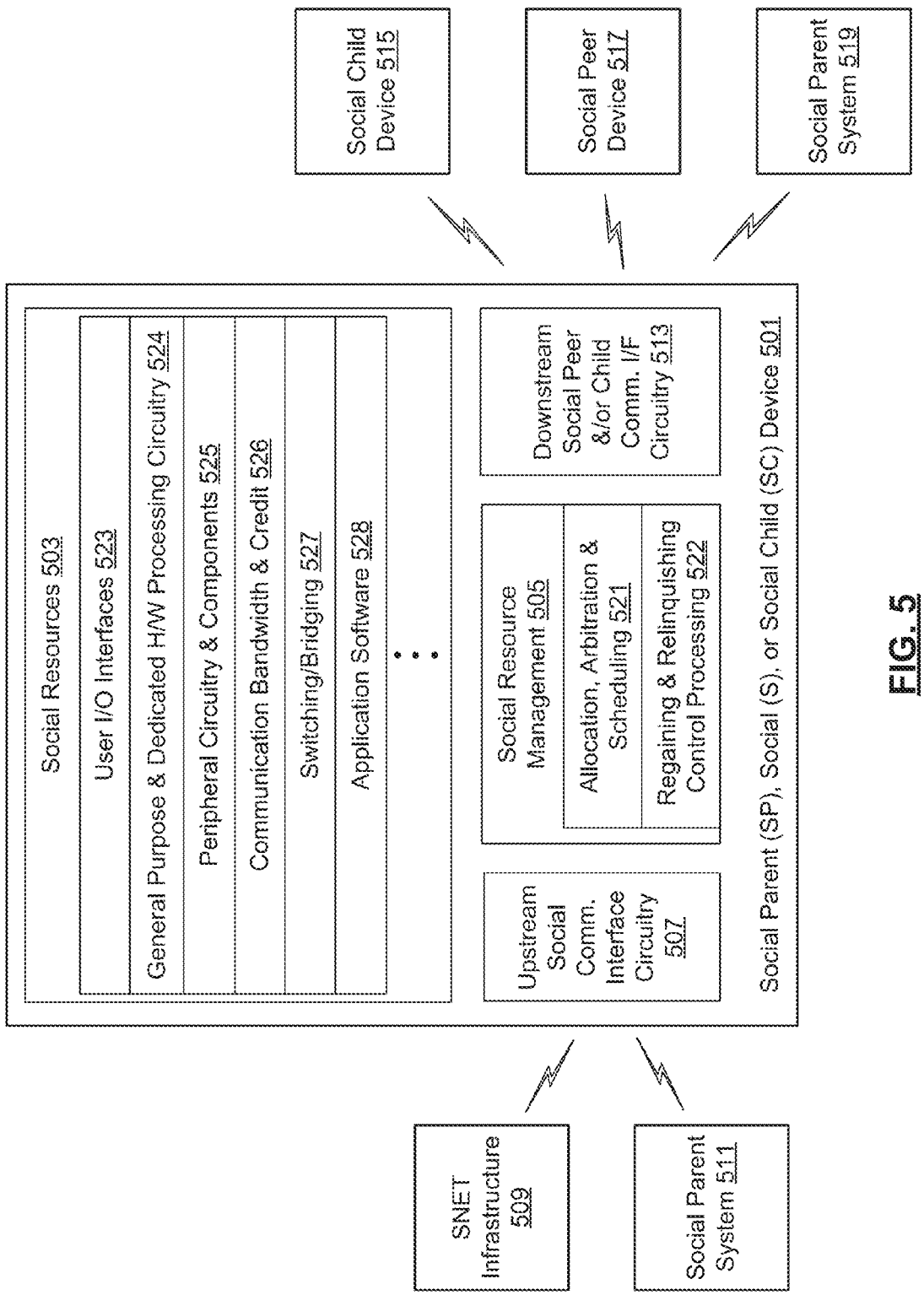
FIG. 5 is a schematic block diagram of a social device operable to support various interactions between other social devices and social systems in accordance with an embodiment of the invention.

As described more fully in conjunction with FIG. 5, the illustrated social devices may operate in a social device "hierarchy" comprising social devices, social "parent" (SP) devices and social "child" (SC) devices. Briefly, SP devices may enable associated SC devices to interact and/or connect with a social network, either directly or indirectly. Social capabilities of a SC device can be provided via a SP device.

Further, certain social devices according to various embodiments and applications of the invention, such as the STB/gateway 401 and downstream devices 441-449, may concurrently or selectively function as a social device, SP device, and/or SC device. Associations between SP and SC devices may be established in a selective, automatic or automated manner. For example, docking of the STB/gateway 401 with a SNET infrastructure 405 may result in automatic docking of user(s) home devices.

The STB/gateway 401 of the illustrated embodiment interacts with a SNET infrastructure 405 and (SNET) external media systems 407 via one or more wired and wireless networks/links 403. The wired and wireless networks/links 403 (and 409) may utilize one or more of various transmission media—such as coaxial cable, shielded twisted pair cable, fiber-optic cable, power line wires, and wireless media (radio frequencies, microwave, satellite, infrared, etc.)—and operate in accordance with a variety of communication and networking protocols (TCP/IP, UPnP, IPv6, etc.). In addition, the wired and wireless networks/links 403 may comprise a multi-hop network utilizing a spanning tree protocol, direct wireless connections, peer-to-peer links, etc.

The (SNET) external media systems 407 may comprise, for example, one or more of cable, satellite and/or terrestrial televisions systems. Various headend equipment and services can be utilized by these systems, such as a cable headend that receives television signals for further processing and distribution, and may offer various other services such as internet connectivity.

While the illustrated STB/gateway 401 functions as a social parent device, in alternate embodiments it could have a peer-to-peer or parent relationship with the SNET infrastructure 405 (and SNET members associated therewith) or (SNET) external media systems 407. For example, a cable headend itself might include social capabilities allowing it to participate as a node in a social network.

The STB/gateway 401 of the illustrated embodiment includes a broadcast/unicast/multicast front end 413 that operates to receive compressed digital video, digital audio and other data signals, from either the (SNET) external media systems 407 or SNET infrastructure 405, for further processing and distribution. The front end 413 comprises tuner circuitry 419a operable to isolate particular channels. Signals from the tuner circuitry 419a are then provided to analog-to-digital (ADC) circuitry 420a and demodulation circuitry 421a for conversion into binary format/stream. Once in binary format, forward error correction (FEC) circuitry 422a checks the integrity of the received binary stream. Audio, video, and data extracted from the binary stream may then be decoded (e.g., by decoding 425) into formats suitable for consumption by downstream social devices. It is noted that demodulation circuitry 421a may support one or more modulation techniques, such as Quadrature Phase Shift Keying (QPSK), Quadrature Amplitude Modulation (QAM), Coded Orthogonal Frequency-Division Multiplexing (COFDM), etc.

The front end 413 may be integrated into one or more semiconductor devices that may further support, for example, interactive digital television, networked DVR functionality, IP video over DOCSIS applications, and 3D graphics support. In addition, multiple tuner circuitry 419a (including in-band and out of band tuners), ADC circuitry 420a and demodulation circuitry 421a may be provided for different television standards (such as PAL, NTSC, ATSC, SECAM, DVB-C, DVB-T(2), DVB-H, ISDB, T-DMB, Open Cable) and modulation schemes. Further, in certain embodiments, sharing of channels and associated program information provided by the front end 413 may be considered a social function.

In one alternative embodiment of the invention, functionality of the STB/gateway 401 functionality is performed by a smartphone or mobile computing device. In this embodiment, the "front end" 413 comprises one or more wireless interfaces (including PHY and baseband functions), such as a cellular (3G, 4G, IMT-Advanced, etc.) or wide area network (WiMax, etc.) interface. The interface may support one or more modulation and multiplexing techniques, such as OFDM, OFDMA, SC-FDMA, QPSK, QAM, 64QAM, CSMA, MIMO, etc. In the illustrated embodiment, the wireless interface comprises a transceiver 419b, analog-to digital (ADC) and digital-to-analog (DAC) circuitry, demodulation and modulation circuitry 421b and FEC (such as turbo codes or LDPC codes) circuitry 422b. Encoding, decoding and transcoding 425 functions may be provided by processing circuitry 411.

The STB/gateway 401 also includes upstream social communication interface circuitry 415 for communicating with SNET infrastructure 405 and/or (SNET) external media system 407. Through the social communication interface circuitry 415, the STB/gateway 401 may communicate directly with upstream resources, or offer (bidirectional) bridged communications between such resources and devices (e.g., social devices 441-449) coupled to the STB/gateway 401.

In the embodiment of FIG. 4, STB/gateway 401 interacts with a variety of social devices 441-449 and upstream resources via upstream social communication interface circuitry 415 and downstream social "child" communication interface circuitry 417 coupled to one or more wired and wireless communication networks 403/409. For example, a television interface module 431 communicates with a (digital) television 441 or other media display device to relay television programming and enable available interactive services. Similarly, an audio interface 433 provides audio programming or audio library access to an audio system 443.

The communication interface circuitry 417 further comprises a remote control interface 435 for receiving control signals from a remote control 445. In addition to traditional remote control operations, the remote control 445 may further offer voice and/or gesture control signals that are relayed or mapped to relevant media devices. User interfaces 437 are also provided for communications with one or more user interface devices 447. Gaming interfaces 439 function to provide interactive communications with a gaming system 449. Such communications may involve, for example, online, multiplayer gaming between members a social network and/or external players in a gaming platform.

Various communications between downstream devices 441-449 may be bridged, without substantive modification, to various nodes in a social network via social bridging interfaces 440. Such bridging may operate independently of the set top functionality of the STB/gateway 401. For example, social child devices may communicate directly with a SNET infrastructure 405 to receive "social" channel broadcasts from a social group or IPTV services.

The STB/gateway 401 of the illustrated embodiment includes processing circuitry 411 (which may be comprised of hardware, software, or combinations thereof), social upstream/downstream functionality support 423, and decoding functionality 425 to support social interactions such as those described above. Social upstream/downstream functionality support 423 in this embodiment includes various functions such as social bridging 427, parent-child services 429, and other functionality such as functions 313-327 of FIG. 3. It is noted that the processing circuitry 411 may be made available in whole or part as a SNET resource.

Referring now to FIG. 5, a schematic block diagram is shown for a social device 501 operable to support various interactions between other social devices and social systems in accordance with an embodiment of the invention. The social device 501 is configured with a variety of functions that enable it to operate in a social device hierarchy comprising social (S) devices, social "parent" (SP) devices and social "child" (SC) devices. For example, a social parent device may enable a docked social child device to access resources of the parent device and/or connect to and interact with (directly or indirectly) with a social network. The social child device may be configured with inherent social capabilities, or gain access to such capabilities from or through an associated parent device. Further, a human SNET member might have associated social child devices, or be served by a social parent device via a user I/O interface (523).

A social device 501 according to various embodiments and applications of the invention may also concurrently or selectively function as a social device, SP device, SC device, or even a "grandparent" device that supports (e.g., in a multi-hop environment) a parent device in a SNET group. Dynamic and static hierarchical associations between SP and SC devices may be established in a selective, automatic or automated manner. Further, a social device 501 may take many forms including, without limitation, a smartphone, personal computer, server, tablet device, access point, gateway, network switch/hub, bridging device, set top box, or other device enabled with social capabilities.

In the illustrated embodiment, the social device 501 is communicatively coupled to a SNET infrastructure 509 and/or social parent system 511 via upstream social communication interface circuitry 507. Likewise, downstream social peer and/or child communication interface circuitry 513 enables coupling with a social child device 515, social peer device 517 and/or social parent system (device) 519. Social resources of both upstream and downstream devices may be accessible to one another via the social device 501.

The social device 501 of this embodiment includes social resources 503 that, along with external SNET resources, are managed by a social resource management module 505 and accessible to at least one other SNET group member. Specific social resources 503 may include user I/O interfaces 523, general purpose and dedicated hardware processing circuitry 524, peripheral circuitry and components 525 (which may or may not have social capabilities), communication bandwidth and credit determination functionality 526, switching/bridging functions 527, application software 528, etc.

Among other functions, the social resource management module 505 comprises allocation, arbitration and scheduling functionality 521, as well as the functionality for establishing, regaining and relinquishing control processing operations 522. It is noted that counterpart resource management functionality may be present in the SNET infrastructure 509 and/or other SNET nodes.

In one exemplary embodiment wherein the social device 501 comprises a switching bridge, bandwidth capacity may be dynamically allocated by allocation, arbitration and scheduling functionality 521. Access to bandwidth capacity and other resources of the social device 501 might be available only upon request or per arbitration functions, and selectively terminated when excessive bandwidth/resources are consumed or requested.

Figure 6:
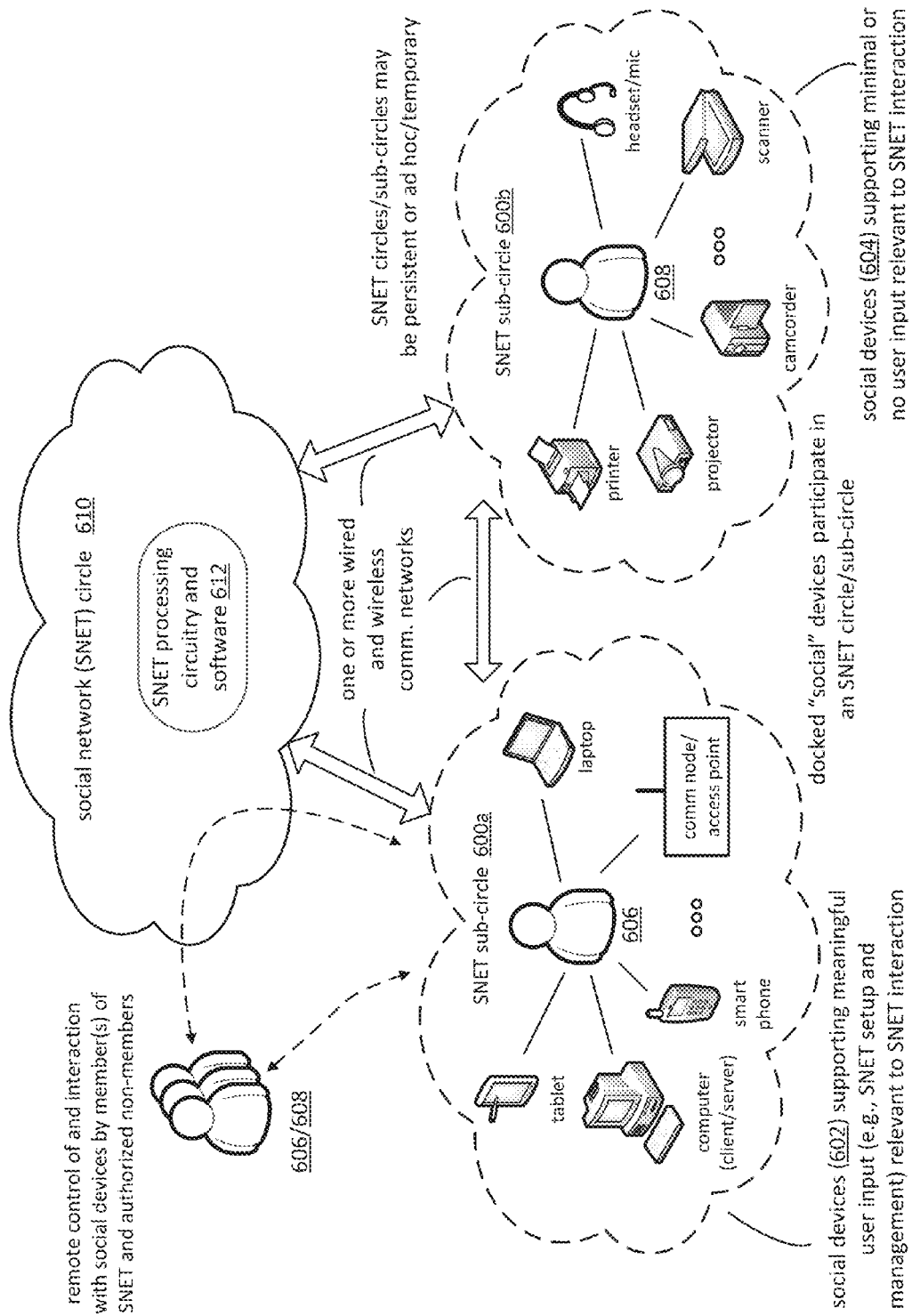
FIG. 6 illustrates various embodiments of social device membership and access in social network circles/sub-circles in accordance with the invention.

FIG. 6 illustrates various embodiments of social device membership and accessibility in social network circles/sub-circles in accordance with the invention. In this embodiment, membership in a SNET circle 610 may be extended to encompass public and private social devices and equipment. For example, in a SNET circle 610 that includes human members 606/608, each human member may have a respective personal SNET sub-circle 600(*a*)/600(*b*) of associated or docked social devices 606/608 capable of independent or aggregated participation in the SNET circle 610. The SNET sub-circle may be locally or remotely accessible by a human member 606/608 and/or other SNET circle/sub-circle members through various means, such as clicking on an icon or tag associated with the human member/personal sub-circle.

Although SNET sub-circles 600(*a*) and 600(*b*) are illustrated as separate sub-circles, such sub-circles may instead comprise a single SNET circle or sub-circle, or any number of additional SNET circles and/or sub-circles, each of which may include various combinations of social devices 602/604. Further, SNET processing circuitry and software 612 of the illustrated embodiment manages formation and operation of the SNET circle 610. The SNET processing circuitry and software 612 may be incorporated in a standalone server, social devices, and/or cloud-based resources. The SNET circle 610 may be persistent or of limited duration, and include ad hoc and/or static associations.

Exemplary social devices 602/604 may be broadly categorized as either (i) social devices 602 that include a user or SNET circle interface sufficient to provide meaningful input to SNET interaction and (ii) social devices 604 that support minimal or no user input relevant to SNET interaction. More particularly and without limitation, the first category may include computers, tablet devices, IPTVs, IPTV set top boxes, smart phones, servers, laptops, cloudbooks, network attached storage devices, gaming consoles, media players/sources, communication nodes (access points, routers, switches, gateways, etc.), user interface devices, power line communication (PLC) devices, etc. Such social devices may receive user input for SNET setup and management. The second category may include, again without limitation, printers, projectors, cameras and camcorders, scanners, speakers, headsets, smoke detectors, alarm systems, video cameras, mice, etc. In general, dockable social devices include any electronic device that could be operably coupled to or docked in a SNET circle/sub-circle via wired or wireless pathways to participate as a SNET member.

As will be appreciated, by docking social devices, members of a SNET circle 610 may gain full or partial remote control and interaction such devices via an authorized member SNET account. For example, family members authorized to participate in a "family" SNET circle may remotely access docked social devices via one or more associated SNET accounts. Exemplary methods for docking and accessing social devices are described more fully below in conjunction with FIGS. 8-10.

Figure 7:
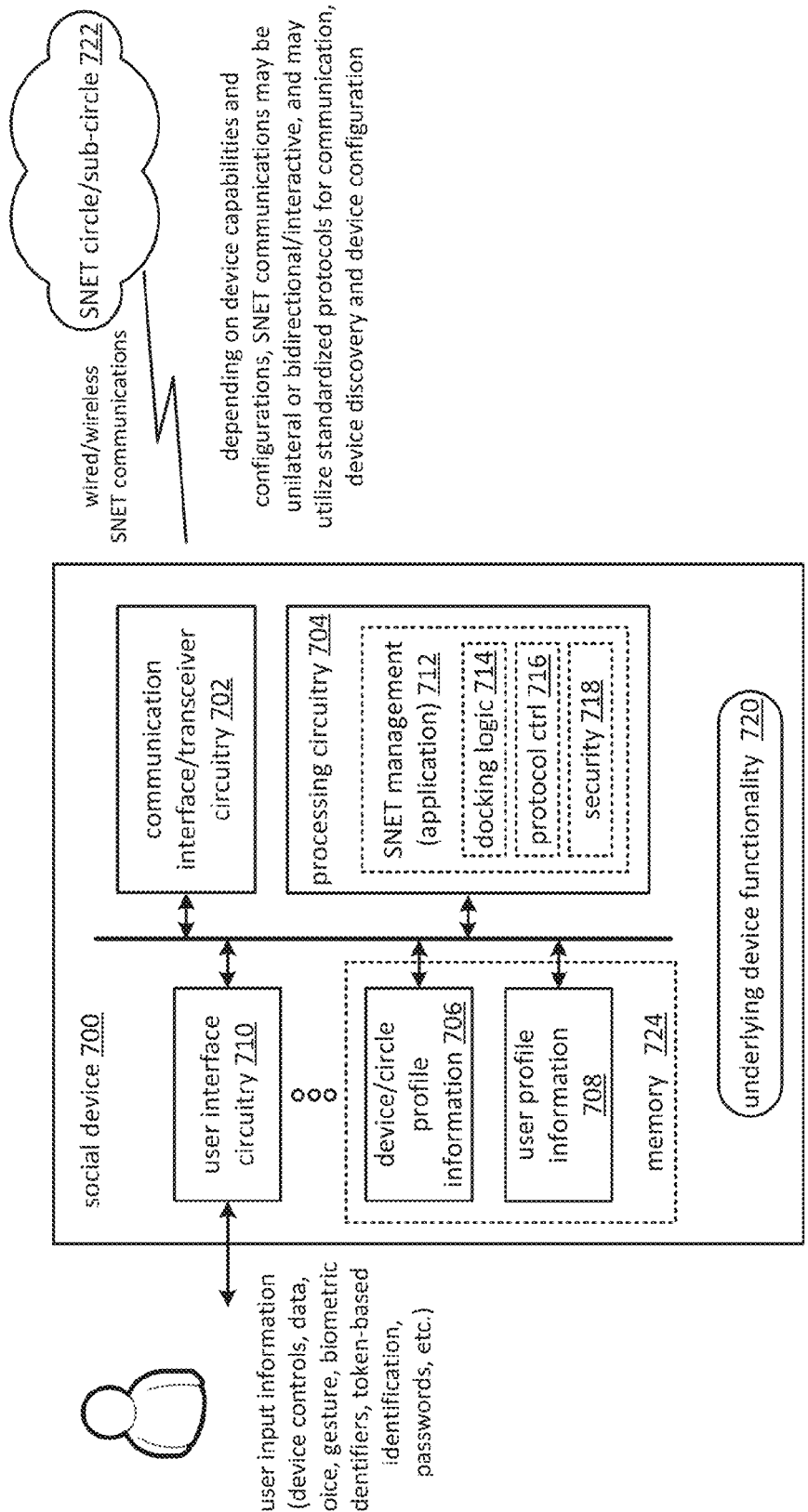
FIG. 7 is a schematic block diagram of an embodiment of a social device comprising integral functionality operable to support social network circle/sub-circle membership and communications in accordance with the invention.

FIG. 7 is a schematic block diagram of an exemplary social device 700 comprising integral functionality operable to support social network circle/sub-circle membership and communications in accordance with the invention. In the illustrated embodiment, a communication interface and transceiver circuitry 702 is operable to perform wired or wireless communications between the social device 700 and a SNET circle/sub-circle 722 over one or more communication channels. Depending on the capabilities and configuration of the social device 700, communications with a SNET may be unilateral or bidirectional/interactive, and utilize either a proprietary or standardized communication protocol. Communications may include, for example, device profile information, user and SNET circle profile information, control signals, media content, interactions with hosted service data, user data, relayed information, etc.

The social device 700 further includes processing circuitry 704 operable to process and manage communications, services and associations between the device and other entities including members of a SNET circle 722, third parties, software agents, etc. More particularly, the processing circuitry 704 may include, for example, a software management application 712 comprising one or more of docking logic 714 (including support for device discovery and configuration protocols such as described below), communication protocol control 716 and security/authentication functionality 718.

The social device 700 further may utilize that may take many forms and be maintained in static or dynamic memory 724. Such profile information enables a social device and/or user to present an image of itself and its capabilities to other members of a SNET. As described more fully below, device and user profile information 706 and 708 may be utilized in various ways in accordance with the invention to facilitate a variety of social interactions. Depending on the capabilities and requirements of a particular device (and other members of a SNET), a device or user profile may be static or dynamic.

In certain embodiments, the social device 700 may interact with a user(s) via user interface circuitry 710. User input to the social device 700 may include, for example, data entry through a keypad, touchscreen, remote control device, gaming controller, device control buttons, voice or gesture commands, storage device, etc. Authorized access to or control of the social device 700 can be facilitated through unique biometric identifiers, passwords, token-based identification, trusted authorities or documents such as a driver's license or passport, and like authentication means.

The social device 700 may perform core or underlying functionality 720, various examples of which are described herein. Alternatively, the social device may primarily function as a social networking interface or communication device, or be programmable to perform specific functions within a SNET circle/sub-circle.

Figure 8:
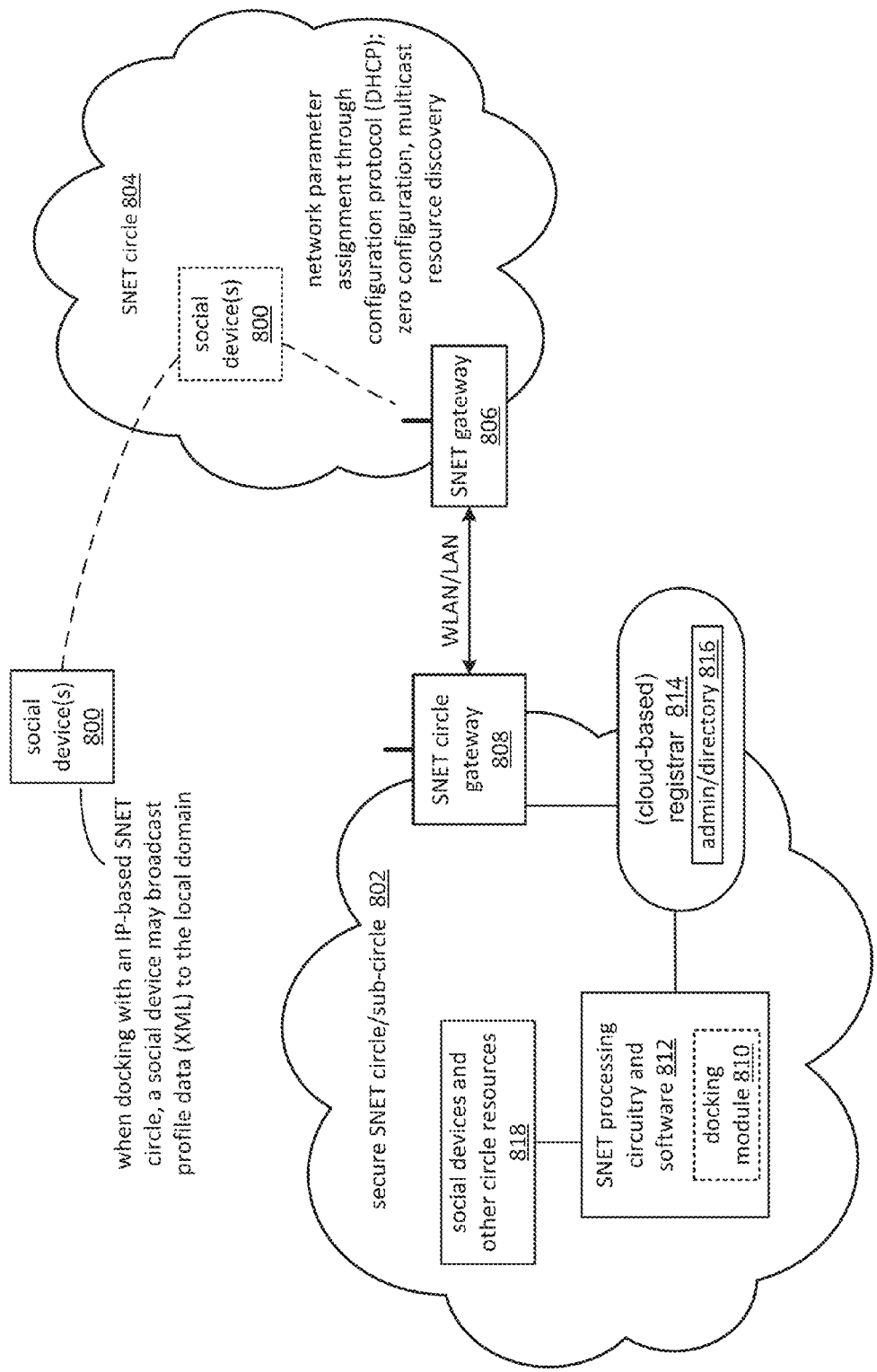
FIG. 8 is a schematic block diagram of an embodiment of social device docking with a social network circle/sub-circle in accordance with the present invention.

FIG. 8 is a schematic block diagram of social device docking with a social network circle/sub-circle in accordance with the present invention. In the illustrated embodiment, a social device 800 may indicate a desire to associate, dock, or otherwise communicate with a (secure) SNET circle/sub-circle 802. The social device 800 device can be autonomous and independent or, alternatively, a participant in a second SNET circle 804 or other network serviced by the SNET gateway 806.

In one embodiment, either the SNET gateway 806 or SNET circle gateway 808 functions as a proxy for the social device 800. Proxy functionality within the SNET gateway 806 may be provided by a software application or a computer system (server) that functions as an intermediary for requests from clients (including connected social devices) seeking resources from other servers or gateways such as SNET gateway 808. Such resources might include files, services, web pages, connections, profiling information, and interaction with social devices and other available SNET circle resources 818.

The SNET gateway 806 may evaluate requests from social devices according to various filtering rules. For example, the SNET gateway 806 might filter traffic by IP address or protocol. Once a request from the social device 800 validated (if necessary), the SNET gateway 806 connects to the SNET circle gateway 808 over a WLAN/LAN or other communication path and requests access to resources of the SNET circle/sub-circle 802 on behalf of the social device 800. The SNET gateway 806 may optionally alter the request from the social device 800 or the response from SNET circle gateway 808 as appropriate.

Membership in the SNET circle/sub-circle 802 is established through a docking module 810 of the SNET processing circuitry and software 812, which may support one or more device discovery and configuration protocols. When circle membership is restricted, a local or cloud-based registrar 814 can be employed to provide authentication. The registrar 814 of the illustrated embodiment may utilize an administrator, or a directory service 816 such as a Lightweight Directory Access Protocol (LDAP)-based directory server that stores attribute data. LDAP is a well-known application protocol for querying and modifying items in directory service. When docking with an IP-based SNET circle, a social device may broadcast profile data to the local domain using a textual data format such as Extensible Markup Language (XML).

Figure 9:
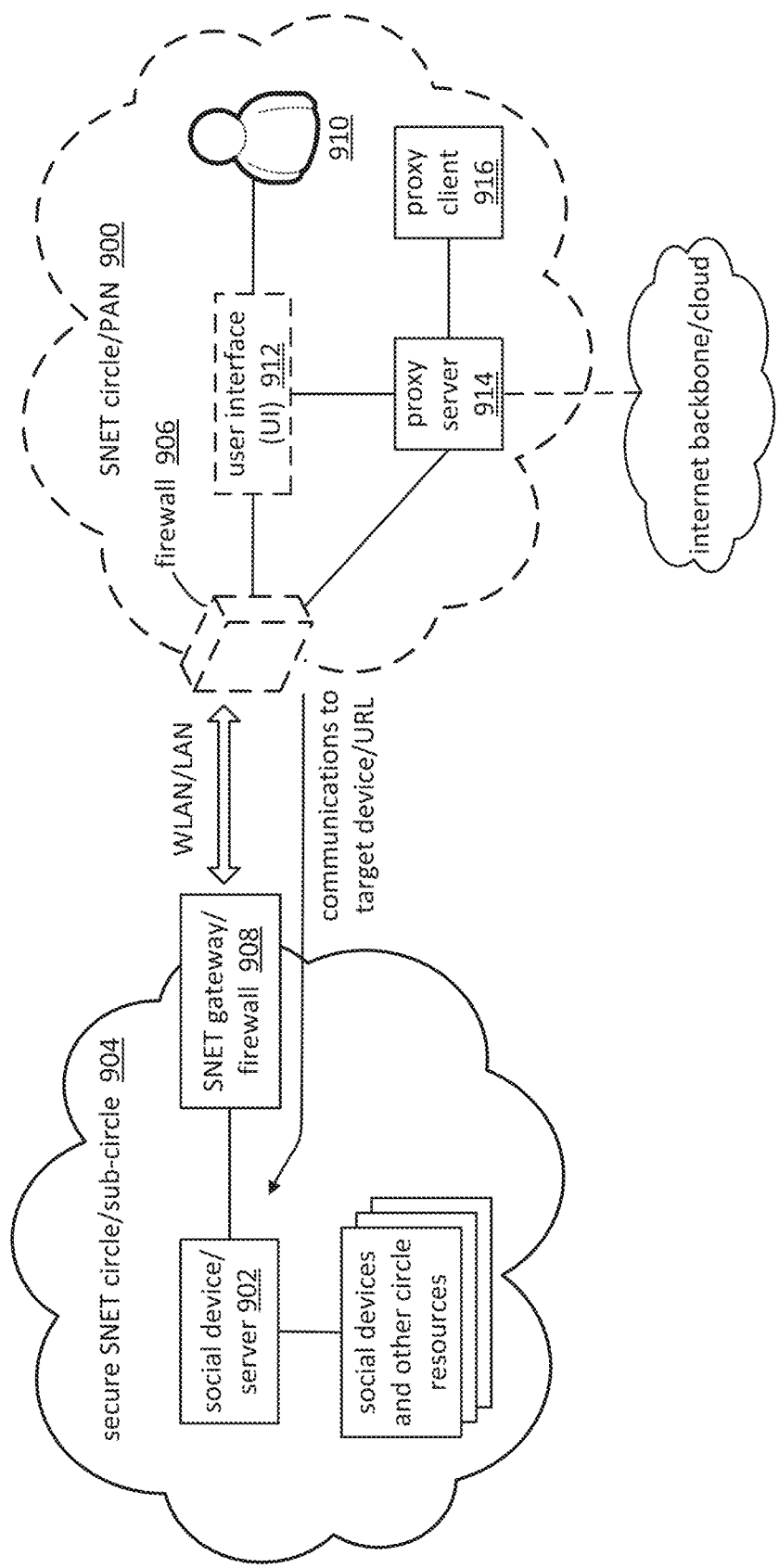
FIG. 9 is a schematic block diagram illustrating access to a social device participating in a social network circle/sub-circle in accordance with an embodiment of the present invention.

FIG. 9 is a schematic block diagram illustrating access to a social device participating in a social network circle/sub-circle in accordance with an embodiment of the present invention. More particularly, a member or resource within a SNET circle/PAN 900 accesses a social device/server 902 (or circle resources such as an Internet-based resource identified by a URL reference) associated with a second, secure SNET circle 904.

Membership in the SNET circle/PAN 900 might include, for example, a human member 910 accessing the SNET circle 904 via a user interface (UI) 912. In various embodiments of the invention described herein, a UI 912 may comprise a graphical user interface (GUI), voice controls, gesture commands, etc. The UI 912 may take the form, for example, of a browser that graphically indicates available resources. Access to the SNET circle 904 can also be provided by a proxy server 914. The proxy server 914 functions as an intermediary for access requests from proxy clients 916—including social devices connected to the proxy server 914 via the Internet or other IP-based networks—seeking to communicate with social devices and/or circle resources of the SNET circle/sub-circle 904. Such resources might include files, services, web pages, connections, profiling information, and other available SNET circle resources. It is noted that the human member 910 and proxy server 914 may operate independently of a SNET circle or PAN. Further, the proxy server 914 may be a distributed or cloud-based entity, or a member of (or incorporated in a member of) the SNET circle/sub-circle 904.

In the illustrated embodiment, communications with the SNET circle/sub-circle 904 flow between a firewall 906 and/or a SNET gateway/firewall 908 over a WLAN/LAN communication channel. The firewall(s) may be software based (e.g., as part of an operating system), or comprise various combinations of software and/or hardware components. In addition, a firewall may be incorporated in a gateway/router such as the SNET gateway/firewall 908. In certain embodiments, the firewall may be operable to perform basic routing functions.

Figure 10:
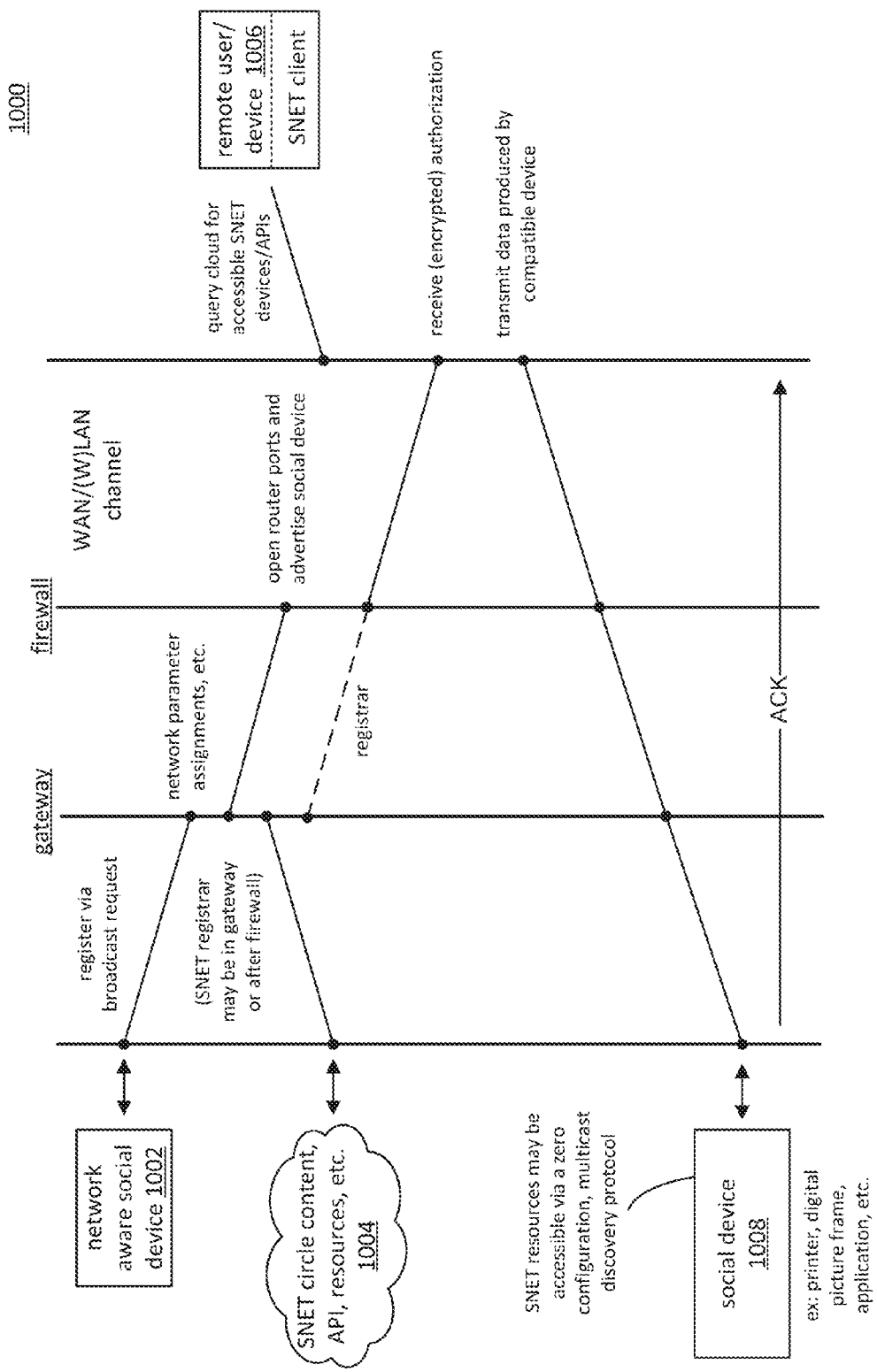
FIG. 10 is a state diagram depicting social device docking and remote access in accordance with an embodiment of the present invention.

FIG. 10 is a state diagram 1000 depicting social device docking and remote access in accordance with the present invention. The diagram 1000 illustrates one embodiment of a method for (1) docking of a social device with a SNET circle and (2) granting a non-member entity access to various resources of a SNET circle. Various other methodologies and protocols may be employed to achieve the foregoing operations without departing from the scope of the invention.

Referring first to the network aware social device 1002, exemplary steps are shown for docking or otherwise associating with a SNET circle 1004. In this embodiment, the social device 1002 broadcasts a request to register with or access a SNET circle. The request may occur as part of initiation or power-up of the social device 1002, on a proximity or ad hoc basis, or other trigger event.

The registration request may be received by at least one gateway device. The gateway functions to configure the social device 1002 such that it can communicate with other hosts. In an IP-based network, typical configuration information might include an IP address and default route and routing prefix. The gateway may be a standalone device, multi-function computing device, etc., and can operate in an ad hoc manner or be persistent.

In one illustrative embodiment, the network configuration protocol utilized by the gateway may be the Dynamic Host Configuration Protocol (DHCP) and related standards, promulgated and maintained by the Internet Engineering Task Force (IETF), or similar protocol that automates network-parameter assignment to network aware social devices 1002. In addition to eliminating the need for manual device configuration, DHCP provides a central database of devices that are connected to the network and eliminates duplicate resource assignments.

Upon a trigger event (e.g., power-up, registration with a SNET circle, etc.), the social device 1002 can transmit configuration/capability information to one or more other devices. Such information may be advertised to specific devices identified by the social device 1002. The configuration/capability information may also be transmitted to any device in a SNET circle, or any device capable of receiving the transmission. A device can, in some embodiments, determine the configuration/capability information of other devices by querying them, individually or as a group.

SNET circle resources may also be accessible via a zero configuration, multi-cast discovery protocol that locates devices, such as printers, and the services offered by those devices on a local network using a multicast discovery protocol and related service records or profiling information. Such a protocol may operate at the application layer, and transmissions of configuration/capability information can be used, for example, to identify and utilize common programming interfaces, protocols, packet formats, and the like between two or more devices. In addition, a bridge or proxy node that communicatively couples two or more devices may utilize a multicast-type discovery and access protocol. In certain embodiments, a bridge or proxy node may communicate or relay queries and advertisements regarding configuration/capability information, and may further operate to process, transcode or modify transmissions relating to configuration/capability information of devices.

Wide area service discovery of SNET circle resources may be enabled through an appropriately configured domain name service (DNS) server or the like, or a multicast-type protocol that performs DNS-like operations. Further, SNET circle resources may be configured to support interoperability guidelines and network protocols, such as Universal Plug and Play (UPnP), that provide uniform mechanisms and restrictions for accessing resources and media over a network.

Depending on the particular implementation, gateway (DHCP server) may utilize various methods to assign and allocate IP addresses. Briefly, a network/SNET circle administrator can assign a range of available IP addresses. Each social device can be configured to request an IP address when joining a SNET circle or during SNET circle initialization. Next, an IP address can be granted using a "lease" approach that includes a configurable time period, thereby enabling the gateway to dynamically reclaim and then reallocate IP addresses that are not renewed (e.g., a social device powers off or otherwise terminates communication with a SNET circle).

Alternatively, the DHCP server may permanently assign an available IP address to a social device. Under this approach (and the "lease" approach), the DHCP server maintains a table of previous IP address assignments, such that it may preferentially assign an IP address that was previously assigned to a requesting social device. In yet another approach, a DHCP server may restrict IP address assignment to devices included in a table with MAC address and IP address pairs.

Once the social device 1002 is configured, the gateway communicates with a firewall to open up communication ports, thereby permitting network transmissions to/from the social device 1002. Registered ports are typically used by networked applications as transitory source ports when contacting servers, but they can also identify named services that have been registered by a third party.

In addition to opening ports for devices, the firewall may function to advertise the social device 1002 to local and remote users/devices and services over, for example, a WAN/(W)LAN communication channel. In one embodiment, social device 1002 IP addresses and profiles are communicated to SNET circle members and remote users/devices. In another embodiment, a gateway may function as a proxy (such as described above in conjunction with FIG. 8) for social devices, including legacy devices that might otherwise require human involvement. The firewall may be software-based (e.g., as part of an operating system), or comprise various combinations of software, firmware and/or hardware components. In addition, the gateway may include bifurcated firewall functionality for connections to SNET circles/sub-circles and remote devices, respectively.

Social device 1002 participation in a SNET circle/sub-circle can be established through a docking module or like functionality in a SNET circle. When SNET circle membership is restricted, a local or cloud-based registrar can be employed to provide authentication services (using a directory service, for example). The registrar may be located in or on either side of the gateway, including after firewall, or it may operate independently of a gateway. Further, the registrar might provide registration functions for both the social device 1002 and/or a remoter user/device 1006.

When docking with an IP-based SNET circle, the social device 1002 may broadcast profile data to the local domain using a textual data format such as Extensible Markup Language (XML). Upon successful docking of a new social device 1002, a SNET circle node (e.g., docking module) provides authorized access to SNET circle. It is contemplated that the social device 1002 may simultaneously participate in more than one SNET circle.

Referring to the remote user/device 1006, a process is illustrated for accessing resources in a SNET circle such as a social device 1008. In one embodiment, the remote user/device 1006 employs an embedded SNET circle client to establish communications with the social device 1008. In operation, the client queries the cloud, over a WAN/(W)LAN or like communication channel, for accessible SNET devices and APIs. Visibility of other SNET circle devices/resources might be selectively determined by a SNET circle owner or administrator.

Upon detection of the social device 1008 and affiliated SNET circle, access by the user/device 1006 may require a registration process such as that described above. If access is to be granted, the user/device 1006 receives authorization information, which could be encrypted and involve the exchange of encryption keys with a SNET circle or registrar. Access to the SNET social device 1008 might also require a username/password. Prior to or following authentication of the user/device 1006, the SNET circle client can be configured to broadcast profile information relating to the social device 1008.

In one embodiment, after access to the social device 1008 is established, the user/device 1006 transmits data to the social device 1008 for further processing. Such data may be produced by a driver or device that is compatible with the advertised capabilities of the social device 1008.

By way of example, if the social device 1008 is a networked printer, the user/device 1006 can transmit a document to the printer or relevant SNET circle URL for printing. In another embodiment wherein the social device 1008 is a digital picture frame, the user/device 1006 provides an image for display, either automatically or via remote activation (such as a voice command). In yet another exemplary embodiment, the social device 1008 comprises a shared folder that is accessible, for example, by students in a classroom SNET circle. An acknowledge protocol can be utilized to confirm successful communications between the user/device 1006 and social device 1008.

SNET circle resources may be accessible via a zero configuration, multicast discovery protocol that locates devices, such as printers, and the services offered by those devices on a local network using a multicast discovery protocol and related service records or profiling information. Such a protocol may operate at the application layer. Wide area service discovery of SNET circle resources configured in this manner may be enabled through an appropriately configured domain name service (DNS) server. Further, SNET circle resources may be configured to support interoperability guidelines and network protocols, such as Universal Plug and Play (UPnP), that provide uniform mechanisms and restrictions for accessing resources and media over a network.

SNET circle communications in accordance with the invention may utilize a variety of transmission protocols. By way of example, most communication over the Internet is currently performed in accordance with the Transmission Control Protocol (TCP) and User Datagram Protocol (UDP). As is known, TCP typically provides an intermediate level of communication services between, for example, an application program and the Internet Protocol (IP). Port numbers are used to identify end-points for sending and receiving applications on a host (often referred to as "Internet sockets" or "network sockets"). Internet sockets facilitate delivery of incoming data packets to an appropriate application process or thread, as determined by a combination of local and remote (e.g., SNET circle) IP addresses and port numbers. In some embodiments, the Real-time Transport Protocol (RTP) running over UDP may be employed for media streaming applications, real-time multiplayer gaming, voice over IP (VoIP), and like applications that are tolerant of a certain level of packet loss and may not require a dedicated end-to-end-connection.

Figure 11:
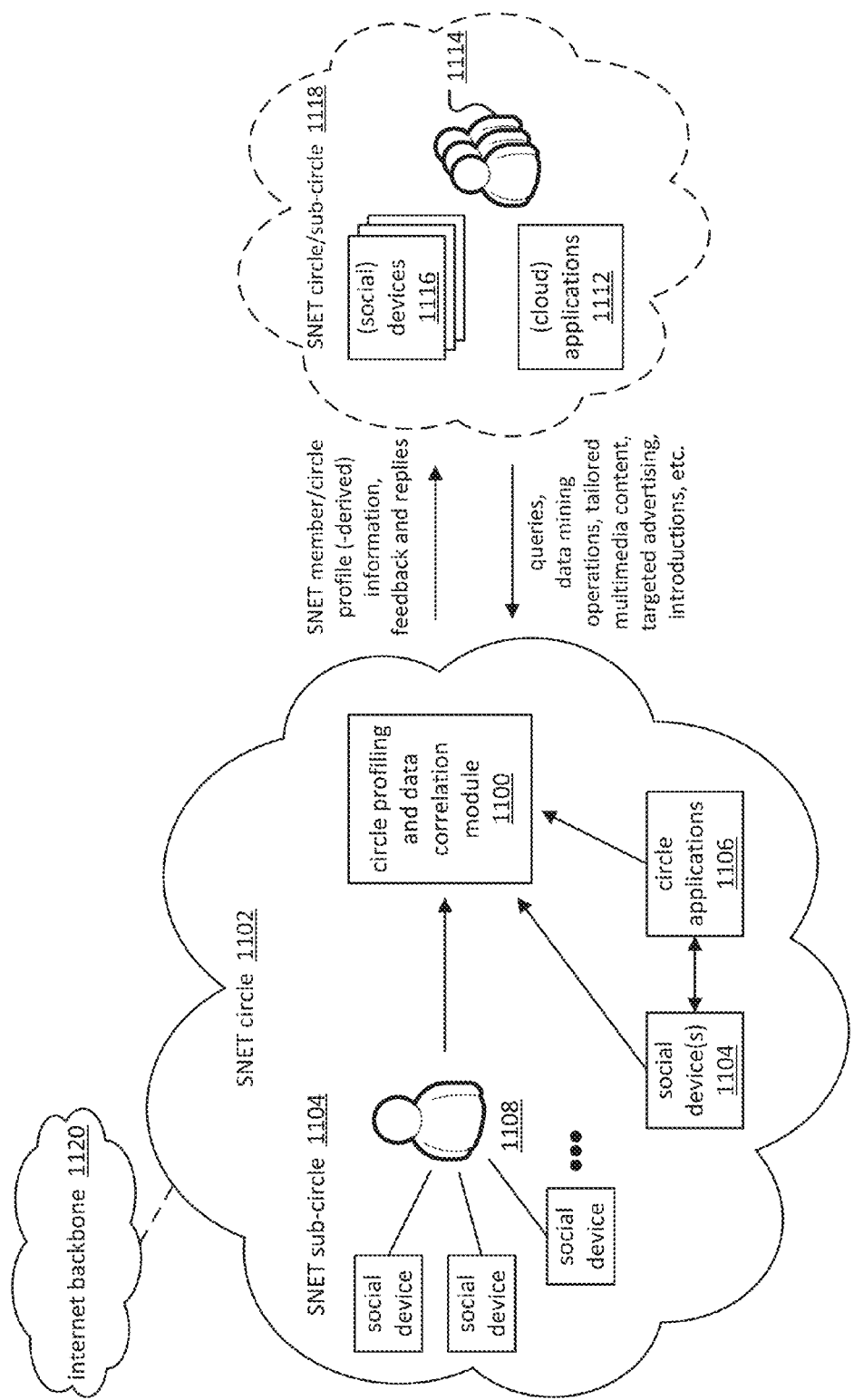
FIG. 11 is a is a schematic block diagram of an embodiment of social device-based profiling supporting advertising and group offerings in accordance with the present invention.

FIG. 11 is a schematic block diagram of an embodiment of social device-based profiling to support advertising and group offerings in accordance with the present invention. In particular, a circle profiling and data correlation module 1100 operates within a SNET circle 1102 (or an affiliated network) to compile profile and profile-related data regarding circle members. In the illustrated embodiment, members of the SNET circle 1102 include social devices 1104, circle applications 1106, and a SNET sub-circle 1104 comprised of a human member 1106 and affiliated social devices.

Data compiled by the circle profiling and data correlation module 1100 may be used by members of the SNET circle 1102 to perform a variety of operations. The data may further be accessed by a separate or intersecting SNET circle/sub-circle 1118. Membership in the SNET circle/sub-circle 1118 includes, for example, cloud-based applications 1112, human members 1114 (via an API), and a variety of social devices 1116. In an alternate embodiment, such entities operate independently of a SNET circle/sub-circle.

As described more fully below in conjunction with FIGS. 12 and 13, a wide variety of information, including: SNET member/circle profile (-derived) information; feedback and replies from the SNET circle 1102; queries and other data mining operations; tailored multimedia content; targeted advertising; introductions, etc.

Figure 12:
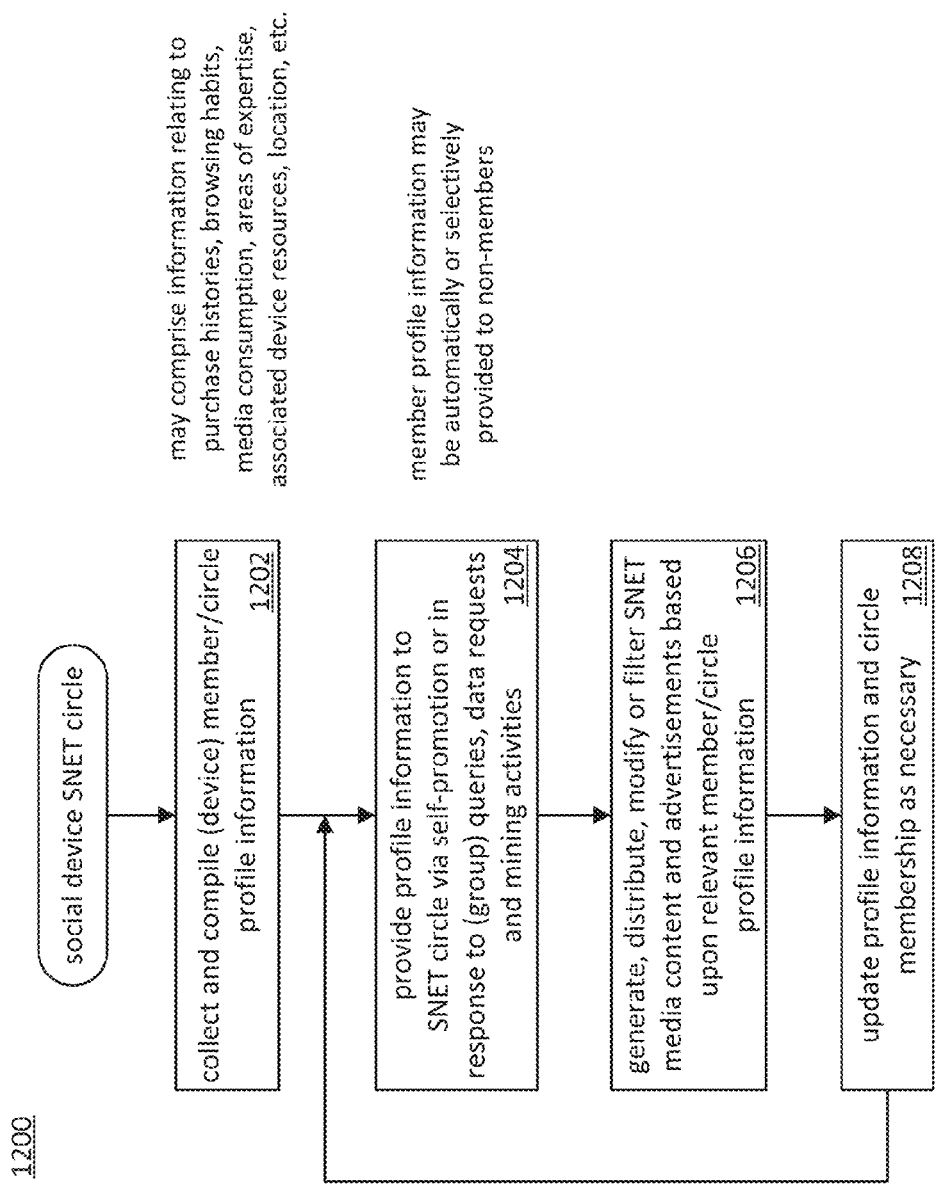
FIG. 12 is a logic diagram of an embodiment of a method for social device-based profiling and self-promotion to support advertising and group offerings in accordance with the present invention.

FIG. 12 is a logic diagram of an embodiment of a method 1200 for social device-based profiling and self-promotion to support advertising and group offerings in accordance with the present invention. In step 1202, a SNET circle member profiling module or like functionality compiles usage information and other profile information pertaining to an associated SNET circle device(s). Such information may comprise, for example, media consumption history, a list of Web addresses accessed by the device, installed applications, device location, parental control restrictions and/or device identification information sufficient to associate specific browsing or purchasing activity with a specific SNET circle member/device. Other information that may be compiled includes, but is not limited to, a list of associated social devices and device capabilities.

In optional step 1204, compiled profiling information relating to a social device or group of social devices is provided to a SNET circle by a profiling module or docked social device(s). Communication of the profiling information may be accomplished via self-promotion by a social device with access to the profiling information, or in response to (group) queries, data requests and/or data mining activities. In addition, profiling information may be automatically or selectively provided to non-members of the relevant SNET circle.

Next, in step 1206, the profiling information is utilized to generate, filter, distribute and/or modify SNET circle content. In various exemplary embodiments, profiling information is utilized by applications or widgets (e.g., a shopping application) to generate targeted content. Uses for profiling information may include: adding personalized advertisements to a content stream; interactive features/advertising based on previously viewed content; generating or embedding an advertising channel for a particular SNET circle (with or without click-through contingent content access); time synchronized or prioritized advertising; and generating a stream of advertising content that is displayed differently to different SNET circle members.

Likewise, content may be dynamically modified based on a consumer's SNET circle memberships. For example, if a consumer is a member of an Alcoholics Anonymous SNET circle, a beer bottle in a movie scene might be replaced with a soda bottle. Advertisements may also be filtered or sent to a various member-affiliated devices in a SNET circle (such as a member's cell phone) based on the proximity data, SNET circle memberships of children, etc. Profiling information for a SNET circle and circle members may be updated (step 1208) on a continual or periodic basis as necessary to support desired functionality.

Figure 13:
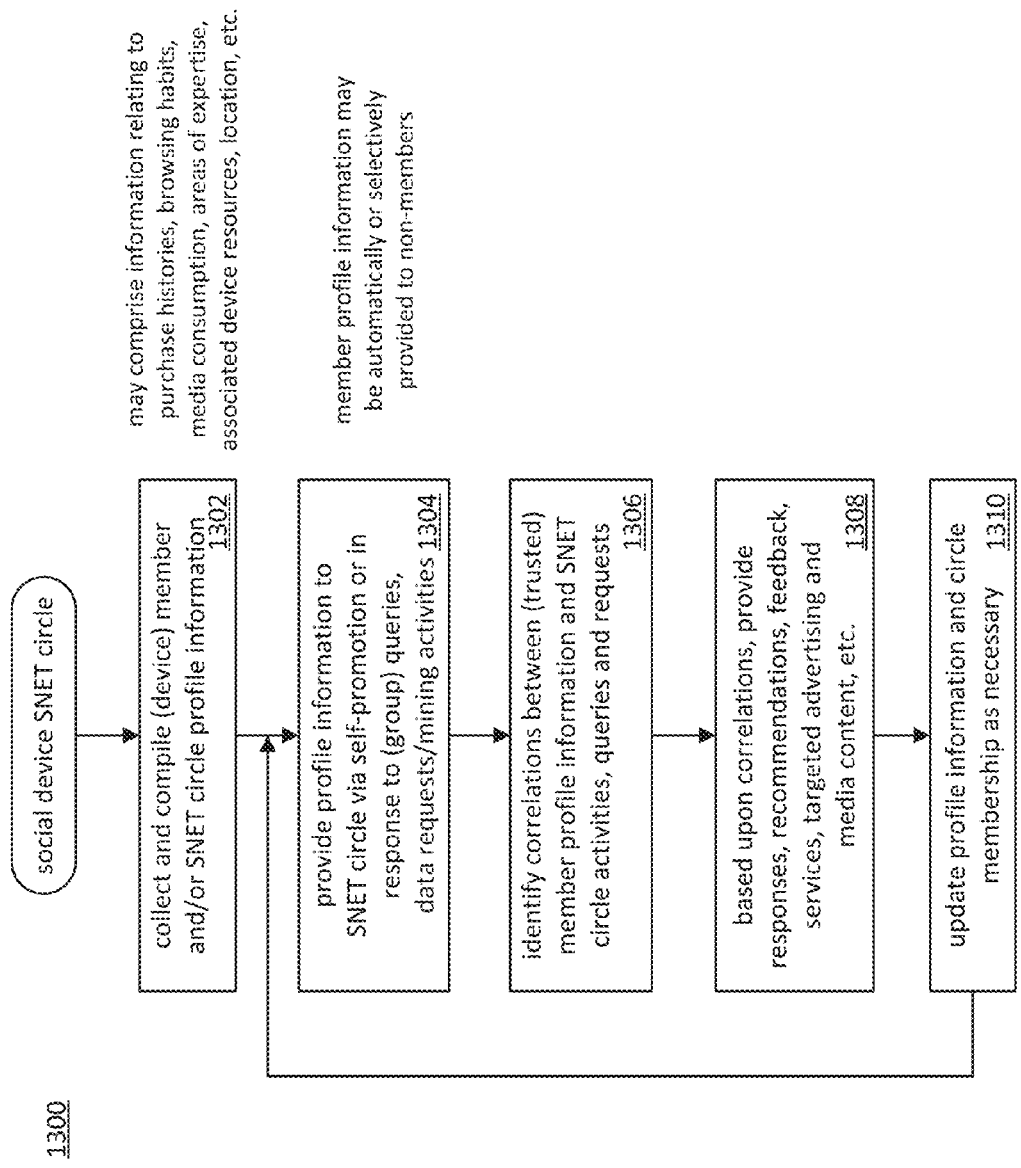
FIG. 13 is a logic diagram of an embodiment of a method for correlation-based interactions with a SNET circle based on profiling data in accordance with the present invention.

FIG. 13 is a logic diagram of an embodiment of a method 1300 for correlation-based interactions with a SNET circle based on profiling data in accordance with the present invention. More particularly, in step 1302 a profiling and data correlation module (900) operates within a SNET circle, an affiliated network or the cloud to compile profile and profile-related data regarding circle members.

In step 1304, compiled profiling information is optionally provided to SNET circle members by the profiling module or a docked social device(s) with access to the profiling information. Communication of the profiling information may be accomplished via self-promotion by a social device, or in response to (group) queries, data requests and/or data mining activities. In addition, profiling information may be automatically or selectively provided to non-members of the relevant SNET circle.

Next, in step 1306, the profiling module and data correlation module of the illustrated embodiment utilizes such information directly in a correlation manner to find alignments with SNET circle activities, queries and requests. As shown in step 1308, a SNET circle might then use profiling data and correlations to provide responses to queries, recommendations, feedback, services, targeted advertising and media content, etc. Profiling information for a SNET circle and circle members may be updated (step 1310) on a continual or periodic basis as necessary to support desired operations. In addition, a device profile associated with a social device(s) may be based on correlation information and enable the device to present an image of itself and its capabilities to other members of a SNET circle. Depending on the current capabilities and requirements of a particular device (and other members of a SNET), such device profiles may be static or dynamic.

Exemplary correlation operations according to the invention may assemble disparate data in an effort to better understand a range of human biases and behaviors. By way of example, a person wishing to purchase a gift might utilize a SNET circle member's past content consumption to educate the gift selection process. Purchases based on recommendations might be tracked for purposes of providing commissions, credits, discounts, etc. Data mining information may be made available in order to solicit recommendations and advice from other SNET circle nodes or remote devices and services. In addition, the profiling and data correlation module may operate to aggregate anonymous data in order to identify SNET circle interests. Such data may include, for example, preferred member devices, purchasing histories, website interactions, travel inclinations, etc. In one embodiment, select member profiling information and/or permissive use of tracking software such as "cookies" may be utilized to facilitate data correlation and aggregation activities.

Profiling and correlation information may also be used to generate introductions with people of similar interests (dating, friends and contacts, hobbies and sports, gaming activities using like platforms/software, professions, device ownership, etc.). If desired, offers to participate in a particular SNET circle can be generated or accepted on an anonymous basis.

Member profiling information may further indicate areas of expertise, levels of respect and feedback from other members, etc. For example, if a human social network member is respected, and buys and docks a social device in a circle, other members not willing to spend the time shopping for competitive counterparts may simply purchase the same device. Such sales may be via redirected communications with external sales sites.

Either through auto-self promoting or in response to a group inquiry, a docked social device according to the invention might also deliver advertising information, including providing support for carrying out an order for another social network member. The device may also provide demonstrations utilizing a remote member's identifiable social devices. Further, the device might also perform competitive testing against other devices.

A member of a SNET in accordance with various embodiments of the invention such as those disclosed herein may establish permissions and/or privacy settings that control and restrict who or what may access the member's profile(s) information, connections and circles, as well as define desired degrees of access. Permissions may enable the user to maintain certain information as private or available on a permissive basis only. For example, visibility of specified user information may be limited to users/devices in a SNET(s). Alternatively, specified user information may be publicly available. Likewise, a SNET member may selectively decide to permit others to access personal information such as name, gender, contact information/email address, etc.

As described above in conjunction with FIG. 1 and elsewhere, various embodiments of a SNET circle according to the invention may comprise a wide variety of social devices, device services, proxies, and software applications of various types participating as SNET circle members. Further, social devices and other types of SNET circle members having related or specific characteristics and interdependencies may form SNET circles having specific purposes such as those described below in conjunction with FIGS. 14-16. Various embodiments may comprise, for example, SNET/circle members such as device manufacturers, automobile owners, hospitals and medical providers, repair shops, insurance companies and other third parties that might have an interest in communicating with a human member and/or associated SNET devices. Such SNETs/circles may be stand-alone or an extension of other SNETs/circles.

Figure 14:
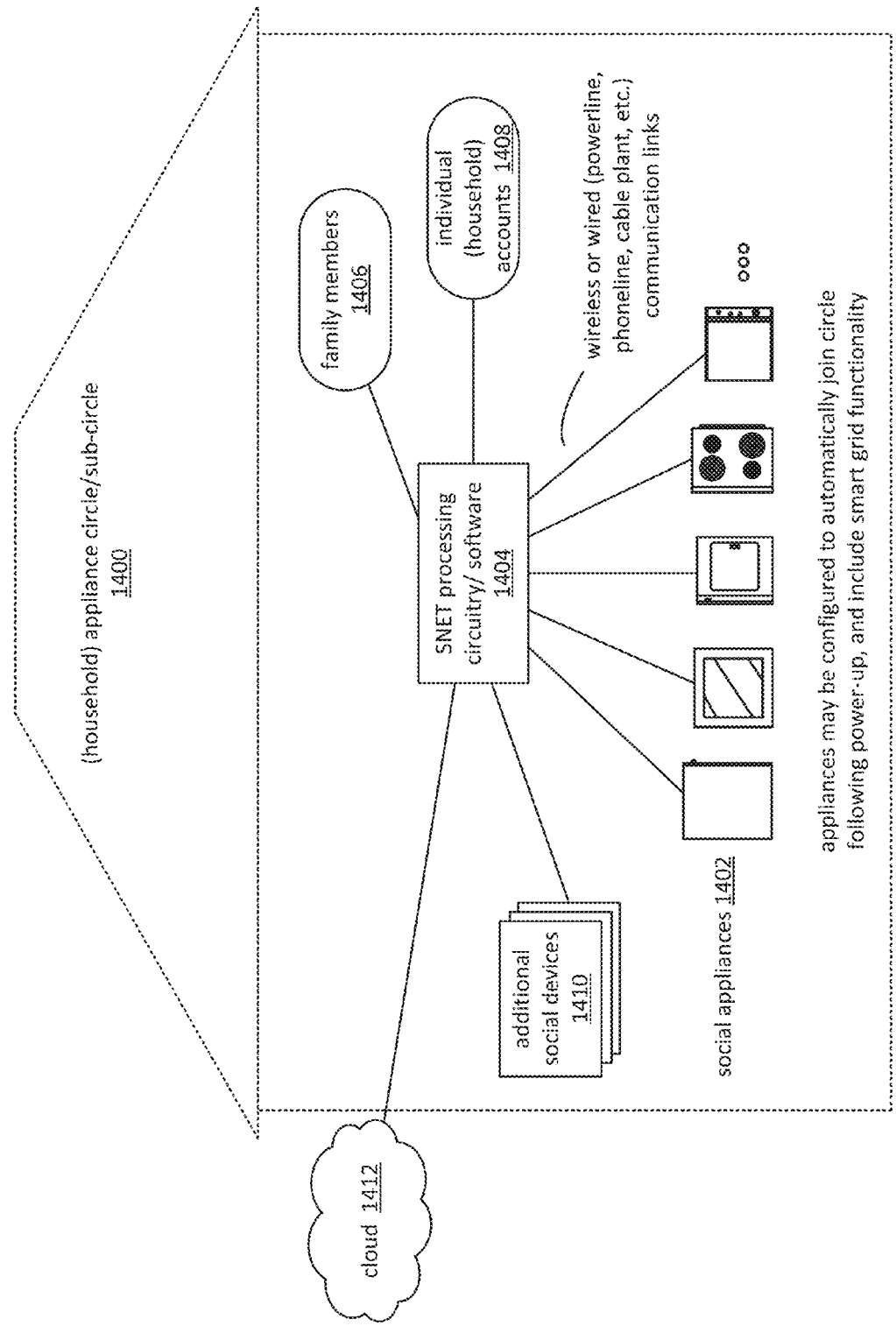
FIG. 14 illustrates various embodiments of an appliance social network circle/sub-circle in accordance with the invention.

Referring first to FIG. 14, an embodiment of an appliance social network circle/sub-circle in accordance with the invention is illustrated. In this embodiment, an appliance circle/sub-circle 1400 comprises a wide variety of (household) appliances/electronics ("social appliances" 1402) that may include, without limitation, washing machines, dryers, refrigerators, televisions, STBs, thermostats, networking equipment, etc. Membership in the appliance circle/sub-circle 1400 allows for a variety of interactions with or between such social appliances 1402, including setup and configuration (as generally described above), testing, registration, firmware and driver updates, sharing, status updates including power consumption information, power company integration, location information sharing, formation of sub-circles of social appliances, permissions management, etc.

Such interaction, including communications with various social devices 1410 and family members 1406 participating in the appliance circle/sub-circle 1400, are facilitated through SNET processing circuitry/software 1404. In addition, interaction between individuals and nodes in the appliance circle/sub-circle 1400 may be enabled through individual (household) accounts 1408. Interactions with authorized non-members may also occur through cloud 1412 communication channels or other networking paths utilized by the appliance circle/sub-circle 1400.

With respect to certain contemplated social appliances 1402 such as smoke detectors, carbon dioxide detectors, alarm system systems and other security devices, automated SNET functionality may be implemented to place automated calls or notifications to family members or emergency response entities (fire departments, law enforcement personnel, etc.) following detection of a safety event. Nearby residences may likewise receive such notifications.

When a new social appliance 1402 joins an appliance circle/sub-circle 1400, the SNET processing circuitry/software 1404 or like functionality may determine the model/sub-model of the appliance, deliver software updates, configure operational modes, etc. Further, the appliance may receive or provide profile information relating to the appliance or other members of the appliance circle/sub-circle 1400. Bidirectional communications with an appliance SNET circle may occur through a powerline/phoneline/cable plant communication system (e.g., via Internet pathways, power company powerlines, or other specified communication pathways). Smart grid functionality and interactions may similarly be conducted through Zigbee, WiFi, NFC, LTE, IMT-Advanced/4G and/or other applicable protocols.

Figure 15:
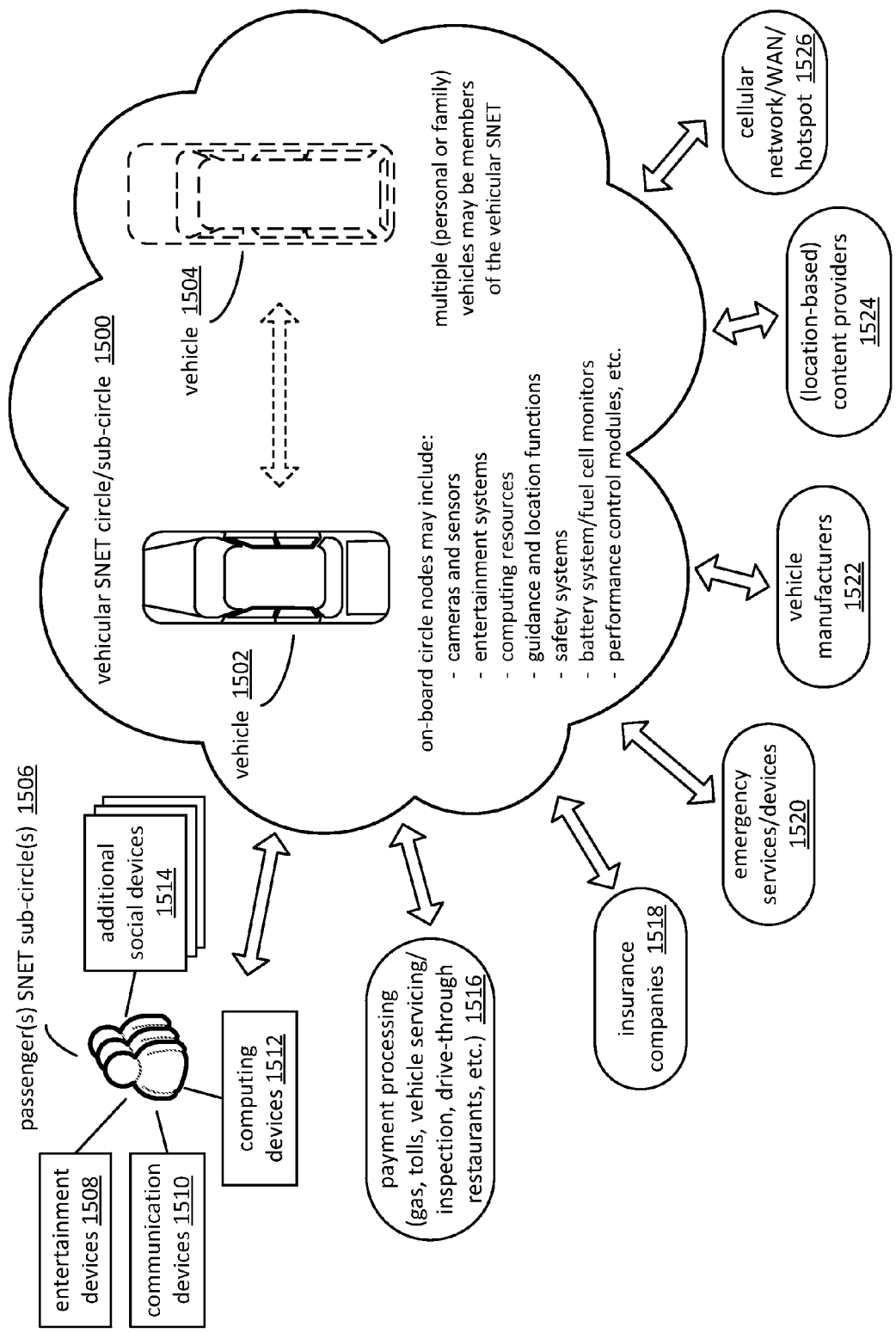
FIG. 15 illustrates various embodiments of a vehicular social network circle/sub-circle in accordance with the invention.

FIG. 15 illustrates various embodiments of a vehicular SNET circle/sub-circle 1506 in accordance with the invention. The SNET circle/sub-circle 1506 includes a vehicle 1502, and may further include one or more additional vehicles 1504, such as co-owned or family vehicles. Various other devices, SNET sub-circles, service and content providers, providers, entities, may participate in the in the vehicular SNET circle/sub-circle 1506. In another embodiment, a vehicular SNET sub-circle 1500 may itself join another SNET circle (e.g., an owner or passenger SNET circle).

More particularly, membership in the vehicular SNET circle/sub-circle 1506 may comprise a passenger SNET sub-circle 1506 comprised of a human member and associated entertainment devices 1508, communication devices 1510, computing devices 1512 and additional social devices 1514. Other participants might include, for example, payment processing services (for automated remunerations for gas, tolls, vehicle servicing/inspection, drive-through restaurants, etc.), insurance companies 1518, emergency services/devices 1520, vehicle manufacturers 1522, and (location-based) content providers 1524. Various nodes of vehicular SNET circle/sub-circle 1506 may include interfaces for communications through a cellular network, WAN or mobile hotpot 1526 and the like. Various usage models include, for example, proximity-based activation of SNET circle nodes such as garage door openers, environmental controls, etc. In addition, an insurance company may participate in order to, for example, view and verify driving behavior histories/data and possibly offer discounts relating to same.

A vehicle 1502 according to the invention may be an automobile, bus, train, industrial or agricultural vehicle, ship, or aircraft. Vehicular nodes/modules in accordance with the invention may control specific components relating to respective functionality. Such on-board circle nodes may include, for example, cameras and sensors, entertainment systems, environmental controls, computing resources, guidance and location functions, safety systems, braking and suspension systems, battery system/fuel cell monitors, emissions control modules, performance/engine control modules, etc. Various such vehicle circle nodes may be configured to communicate with one another.

Communications between modules and members of a vehicular SNET circle/sub-circle 1500 can be conducted, at least in part, over a vehicle network using a standard protocol such as Vehicle Area Network (VAN) or Controller Area Network (CAN). A number of specialized protocols have been developed and are currently employed for vehicular communications, but it is anticipated that many of these protocols will eventually be displaced by more conventional networking technologies such as Ethernet and TCP/IP. Communications in a vehicular SNET circle/sub-circle 1500 may employ wireless communication technologies, and/or physical transmission media such as single wire and twisted pair cabling, fiber optics, power line communications (e.g., power grid connections via a charging station for battery powered vehicles), etc.

Figure 16:
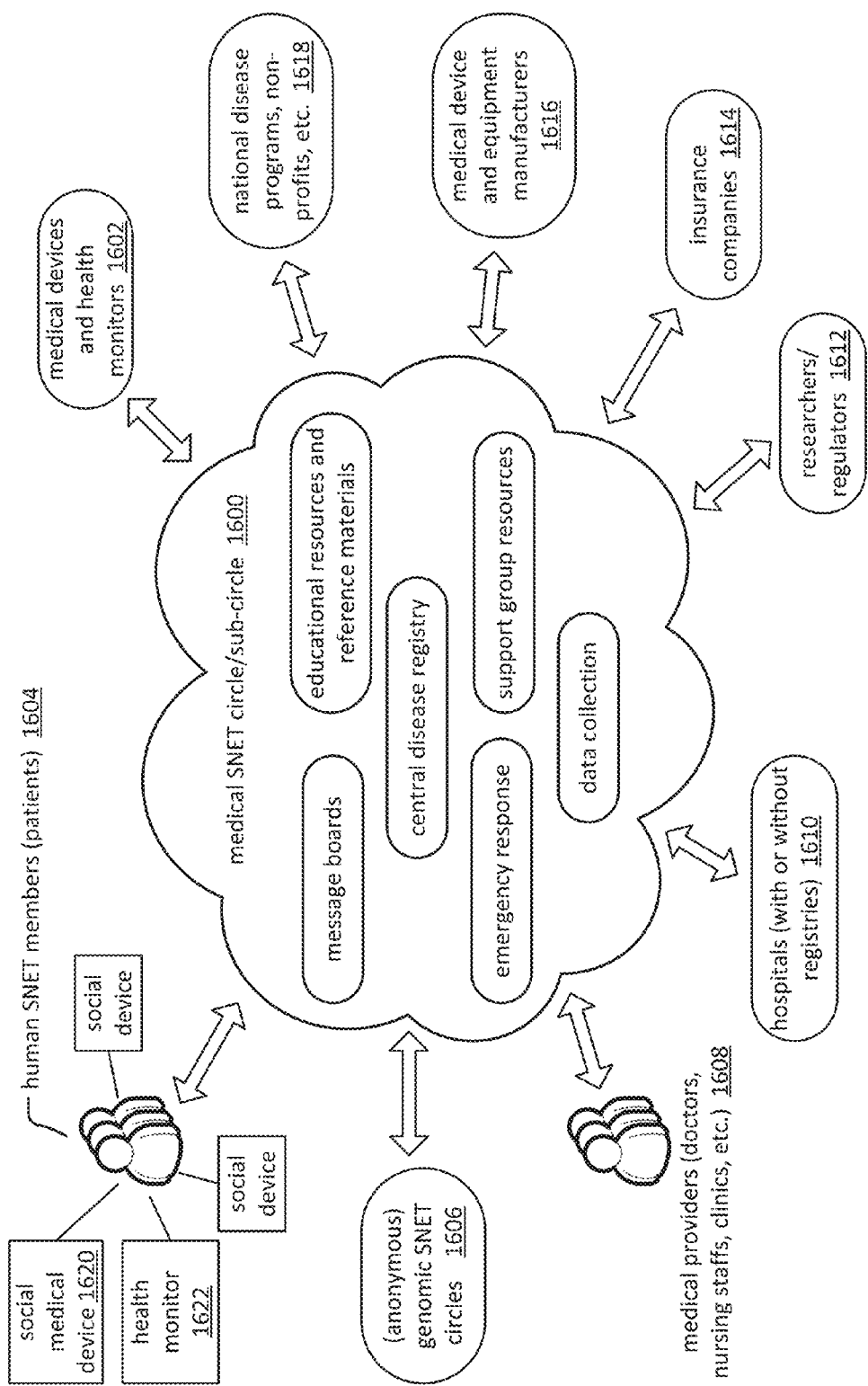
FIG. 16 illustrates various embodiments of a medical social network circle/sub-circle in accordance with the invention.

FIG. 16 illustrates various embodiments of a medical social network circle/sub-circle 1600 in accordance with the invention. Various medical-related resources may be hosted by or accessible through medical social network circle/sub-circle 1600, including centralized disease registries and data collection, message boards, educational resources and reference materials, emergency response services, support group resources, etc.

The medical SNET circle/sub-circle 1600 may further include or interface with: medical devices and health monitors 1602; human or patient SNET members (including respective SNET sub-circles comprised of one or more social medical devices 1620 and health monitors 1622); medical providers (doctors, nursing staffs, clinics, etc.) 1608; hospitals (with or without separate registries) 1610; researchers/regulators 1621; insurance companies; medical device and equipment manufacturers; and national disease programs and non-profits 1618; etc.

Certain embodiments may involve docking of medical devices and health monitors for purposes of user/elderly health monitoring and reporting, or to generate medical and risk profiles. For example, social insulin pumps create grouping opportunities with researchers, doctors, nursing staff, diabetic message boards, help or volunteer resources, pump management and testing, emergency-ambulance notifications, etc.

The medical SNET circle/sub-circle 1600 may also include anonymous genome SNET circles 1606 which are formed, for example, automatically upon uploading of a user genome, and may involve polymorphism/phenotype sub-circles, information regarding genetic defects associated with disease or malfunctions, etc. Genome statistics gathering can be based not only on medical information, but also on genome participants own CV input. In another embodiment, a family tree SNET sub-circle is formed for sharing of genetic information, establishing paternity, identifying possible relatives, making connections (at different levels of ancestry) based on family tree information, etc. Such SNET circles may be integrated with bioinformatics, social medical equipment members, ancestry information, DNA databanks, etc.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A social device used with a social infrastructure that supports a plurality of social network groups, a first of the plurality of social network groups having an associated membership including at least one human member, the social device comprising:
   a communication interface configured to communicate with the social network infrastructure;
   processing circuitry operably coupled to the communication interface;
   at least one device resource supported by the processing circuitry;
   the processing circuitry utilizing the communication interface to establish a device membership within the first of the plurality of social network groups, the device membership belonging to the social device separate and apart from a membership of a user of the social device; and
   the processing circuitry offering the at least one device resource via the first of the plurality of social network groups.

2. The social device of claim 1 wherein the associated membership also includes a second device member, and the at least one device resource is offered for access via the first of the plurality of social network groups by the second device member.

3. The social device of claim 1, wherein the processing circuitry establishes membership within the first of the plurality of social network groups, at least in part, in an autonomous manner.

4. The social device of claim 1, wherein offering the at least one device resource is conditioned upon membership of the social device in the first of the plurality of social network groups.

5. The social device of claim 4, wherein establishing membership within the first of the plurality of social network groups comprises receiving an invitation from the social infrastructure.

6. The social device of claim 5, the processing circuitry configured to autonomously accept or request an invitation to participate in the first social network group.

7. The social device of claim 5, the processing circuitry configured to accept an invitation to participate in the first social network group following an indication of acceptance from a user of the social device.

8. The social device of claim 1, further comprising:
   a user interface coupled to the processing circuitry, the user interface operable to receive input information from a human user of the social device, the input information relating to interaction with the social network group.

9. The social device of claim 1, further comprising a member reporting module coupled to the communication interface, the member reporting module comprising profile information relating to at least one characteristic of the social device, and wherein the communication interface is configured to share the profile information via the social infrastructure.

10. The social device of claim 1, further comprising a member reporting module coupled to the communication interface, the member reporting module comprising profile information relating to at least one characteristic of a user or owner associated with the social device, and wherein the communication interface is configured to share the profile information via the social infrastructure.

11. The social device of claim 1, the communication interface further configured to receive profile information from the first social network group, wherein the profile information comprises information relating to characteristics of at least one node associated with the first social network group.

12. The social device of claim 1, wherein the communication interface and the processing circuitry comprise an integrated circuit device.

13. The social device of claim 1 configured to participate in a first social network group selected from the group consisting of an appliance social network, a vehicular social network, and a medical social network.

14. A social gateway device having functions and social capabilities for participating in a social network group having an associated membership including at least one social device member and at least one human or non-device member, the social gateway device comprising:
processing circuitry configured to support hierarchical interaction with the social network group, including determining a device membership of a social network device within the social network group, the device membership belonging to the social device separate and apart from a membership of a user of the social network device;
an upstream communication interface operably coupled to the processing circuitry and configured to communicate with the social network group; and
a downstream communication interface operably coupled to the processing circuitry, the downstream communication interface configured to communicate with a child node,
the processing circuitry further configured to communicatively couple the social network group and the child node.

15. The social gateway device of claim 14, wherein the social gateway device is a set top box, the social gateway device further comprising a front end coupled to the processing circuitry, the front end operable to receive external media content and convert the media content for consumption by at least one child node communicatively coupled to the downstream communication interface.

16. The social gateway device of claim 14, wherein the social gateway device is a mobile computing device.

17. The social gateway device of claim 14, wherein the downstream communication interface comprises a user interface, wherein the child node is a human user.

18. The social gateway device of claim 14 operable as both a parent social device and a child social device, wherein the upstream communication interface is configured to communicate with the social network group through a parent node.

19. A social device having functions and social capabilities for participating in a social network group having an associated membership including at least one social device member and at least one human or non-device member, the social device comprising:
a communication interface configured to communicate with the social network group;
processing circuitry operably coupled to the communication interface, the processing circuitry configured to support interaction with the social network group by establishing a device membership for the social device within the social network group, the device membership belonging to the social device separate and apart from a membership of a user of the social network device; and
a profiling and correlation module operably associated with the communication interface, the profiling and correlation module configured to compile member profile information relating to at least one member of the social network group,
the communication interface further configured to communicate at least a portion of the compiled member profile information to the social network group.

20. The social device of claim 19, the communication interface further configured to receive requests from members and non-members of the social network group,
the profiling and correlation module further configured to identify correlations between the requests and the compiled member profile information, and generate responsive data based, at least in part, on the correlations,
the communication interface further configured to communicate the responsive data.

* * * * *